US006050878A

United States Patent [19]

Kanzo et al.

[11] Patent Number: 6,050,878

[45] Date of Patent: Apr. 18, 2000

[54] PROCESSING JIG

[75] Inventors: Noboru Kanzo, Miyota-machi; Masahiro Sasaki, Saku-machi; Masaki Kozu, Saku, all of Japan

[73] Assignee: TDK Corporation, Tokyo, Japan

[21] Appl. No.: 09/106,135

[22] Filed: Jun. 29, 1998

[30] Foreign Application Priority Data

Jun. 25, 1998 [JP] Japan .................................. 10-178949

[51] Int. Cl.[7] .................................................. B24B 49/00

[52] U.S. Cl. .................................................. 451/5; 451/1

[58] Field of Search .......................... 269/266, 22; 451/1, 451/5, 405, 364

[56] References Cited

U.S. PATENT DOCUMENTS

| | | | |
|---|---|---|---|
| 4,914,868 | 4/1990 | Church et al. . | |
| 5,468,177 | 11/1995 | Kindler et al. | 451/364 |
| 5,525,091 | 6/1996 | Lam et al. | 451/5 |
| 5,607,340 | 3/1997 | Lackey et al. | 451/5 |
| 5,620,356 | 4/1997 | Lackey et al. | 451/5 |
| 5,816,890 | 10/1998 | Hao et al. | 451/1 |

FOREIGN PATENT DOCUMENTS

| | | | |
|---|---|---|---|
| 094017959 | 1/1994 | Hungary | 451/364 |
| 2-95572 | 4/1990 | Japan . | |

*Primary Examiner*—David A. Scherbel
*Assistant Examiner*—Daniel Shanley
*Attorney, Agent, or Firm*—Oliff & Berridge, PLC

[57] ABSTRACT

A processing jig is provided for deforming an object to be processed that is long in one direction into a complicated shape and processing the object with accuracy. The jig comprises: a main body to be fixed to the processing apparatus; a retainer that is long in one direction for retaining a bar as the object long in one direction; four couplers for coupling the retainer and the main body to each other; three load application sections, coupled to the retainer, to which a load is applied for deforming the retainer; and arms for coupling the load application sections to the retainer. The retainer takes a shape of a narrow and long beam that is bent with an application of external force. The two load application sections on both ends each have three degrees of freedom in two directions orthogonal to each other and a direction of rotation, for example. The load application section in the middle has one degree of freedom in the vertical direction only.

20 Claims, 20 Drawing Sheets

PROCESSING JIG

BACKGROUND OF THE INVENTION

1. Field of the Invention

The present invention relates to a processing jig for holding an object processed with a processing apparatus.

2. Description of the Related Art

A floating thin film magnetic head used for a magnetic disk device and so on is generally made up of a slider and a magnetic head device provided at the trailing edge of the slider. The slider generally comprises a rail whose surface functions as a surface facing a medium (referred to as medium facing surface in the following description) or an air bearing surface and a tapered section or a step near the end on the air inflow side. The rail floats slightly above the surface of a recording medium such as a magnetic disk by means of air flow from the tapered section or step.

A thin film head device generally used is a composite-type device made up of a layer of an induction magnetic transducer for writing and a magnetoresistive (MR) element for reading.

In general, such thin film magnetic heads are formed through cutting a wafer in one direction on which sections to be sliders each including a thin film magnetic head element are arranged in a plurality of rows. A bar-like magnetic head material (called 'bar' in the following description) on which the sections to be sliders are arranged in a row is thereby formed. Processing such as lapping is performed on the medium facing surface of the bar. The bar is then cut into the sliders.

In general, in order to stabilize the output characteristic of the magnetic head, it is important to maintain the distance between the magnetic pole and the surface of a recording medium at an extremely small specific value. It is therefore required in magnetic head processing that the flatness of the medium facing surface of the magnetic head precisely falls on a specific value so as to stabilize a floating amount and that the throat height and the MR height of the magnetic head fall within a specific range. The MR height is the length (height) between the edge close to the medium facing surface of the MR element and the opposite edge. The throat height is the length (height) of the magnetic pole of an induction magnetic transducer.

There are several methods for lapping the medium facing surface so as to achieve desired values of the throat height and MR height of a magnetic head. A method generally used and achieving high precision is the method that utilizes a processing jig having functions described later and a lapping apparatus having a function of automatically lapping while applying an appropriate load to the jig and deforming a bar bonded to the jig.

A processing jig used in the method comprises a main body fixed to a lapping apparatus, a retainer that is long in one direction for retaining a bar, and a plurality of load application sections, coupled to the retainer, to which a load is applied for deforming the retainer. The retainer takes a shape of a narrow and long beam that is bent with an application of external force. An external force being applied to the load application sections of the jig, the retainer is bent. The bending of the retainer causes bending of the bar held by the retainer.

A method of lapping a bar using the jig will now be described. In the method, the bar is fixed to the retainer of the jig with an adhesive and so on so that the surface of the bar to be lapped faces outside.

Next, the values of the throat height and MR height of each magnetic head on the bar fixed to the jig are determined through an optical or electrical method. The deviation of the determined values from the target values, that is, the amounts of lapping required, are calculated.

Of the sections to be lapped corresponding to the magnetic head elements on the bar, the section that require more amount of lapping than the other section needs to be more lapped. Therefore, the bar is deformed by applying a load to the load application section so that the surface to be lapped of the section is made convex. On the other hand, the section that require less amount of lapping than the other section needs to be less lapped. Therefore, the bar is deformed by applying a load to the load applied section so that the surface to be lapped of the section is made concave. The bar is lapped by pressing the medium facing surface of the bar against a rotating lapping plate while the bar is deformed.

A series of operation is automatically repeated, including determining the throat height and the MR height of each magnetic head element, calculating the deviation of the determined values from the target values, that is, the amounts of lapping required, and lapping the bar while deforming the bar in accordance with the amounts of lapping required. Variations in the throat heights and the MR heights of the magnetic head elements are thereby modified. Finally, the throat heights and the MR heights of the magnetic head elements fall within a specific range.

A lapping apparatus for performing lapping of a bar as described above is disclosed in U.S. Pat. No. 5,620,356. A jig for lapping magnetic heads is disclosed in U.S. Pat. No. 5,607,340. A lapping control apparatus is disclosed in Japanese Patent Application Laid-open No. Heisei 2-95572 (1990) for controlling a throat height through observing a resistance of an MR element.

In a lapping method using a jig having three section to which a load is applied for bending a retainer, as shown in U.S. Pat. No. 5,607,340 mentioned above, a lapping amount required is calculated based on the determined values of the throat height and the MR height. In accordance with the amount, a load for pushing or pulling is applied to the load application section in a direction orthogonal to the length of the retainer so as to deform the retainer. The bar is lapped in this state so that the throat heights and the MR heights of the magnetic head elements fall within a permissible range.

Although highly precise throat heights and MR heights are more and more required, it is difficult for the lapping method described above to obtain the throat heights and MR heights within the permissible range throughout the length of the bar when the bar of about 50 mm in length, for example, is lapped.

The reasons will now be described. In the jig, a load for deforming the retainer is applied to the three load application points of the retainer in a direction orthogonal to the length of the retainer. The only shape of the retainer obtained through bending approximates to a curve of the fourth order. Consequently, modifiable distribution patterns of throat heights and MR heights are limited to the patterns that approximate to curves of a low order, that is, the fourth order or below. In contrast, although the values of throat heights and MR heights of most magnetic head elements on a bar actually lapped fall within the permissible range if seen in broad perspective, the distribution of the values of throat heights and MR heights of the magnetic head elements on the bar has a more complex pattern that may approximate to a curve of a high order such as a sixth order or above if seen in narrow perspective. As a result, correction of the throat heights and MR heights is not sufficiently performed on the sections that do not meet the distribution pattern of the throat heights and MR heights that may approximate to a curve of a high order as described above. The deviation of the determined values from the target values is not reduced, either. Therefore, some fall off the permissible range of the throat heights and MR heights.

FIG. 25 shows an example of the distribution of final MR heights 'MR-h' on a bar when the bar of about 50 mm in length, for example, is lapped with a jig of related art while automatically controlling the throat heights and MR heights. The solid line indicates a regression curve of the sixth order of the distribution of MR heights 'MR-h'. The broken line indicates a regression curve of the fourth order of the distribution of MR heights 'MR-h'. In the example shown, the distribution of final MR heights 'MR-h' on the bar approximates to the regression curve of the sixth order.

Most distribution patterns of MR heights on a bar before lapping regress to curves of the sixth order or above. However, the related-art jigs are capable of correcting distribution patterns of MR heights that approximate to curves of the fourth order or below only. Therefore, as shown in FIG. 25, high-order components remain uncorrected in the distribution pattern of MR heights on the bar after lapping. The same applies to the throat height, too.

If a jig with a fewer (that is, one or two) points to which a load for bending is applied is used, distribution patterns of MR heights that approximate to curves of the still lower order are only correctable. As a result, with such a jig, more throat heights and MR heights fall outside the permissible range.

Several methods have been developed and improved for enhancing the straightness of a distribution pattern of throat heights and MR heights without forcedly deforming a jig. However, while the demand for higher-precision throat height and MR height specifications (a permissible range of ±0.01 $\mu$m, for example) is growing, it is extremely difficult to maintain the straightness of distribution pattern of throat heights and MR heights throughout the bar with such a high degree of accuracy. It is practically difficult as well to achieve accuracy of the flatness of the lapping surface of a lapping plate and the consistency of a lapping rate throughout the surface. Therefore, the method of controlling throat heights and MR heights without forcedly deforming a jig has limitations in terms of accuracy.

On the other hand, a method of reducing the length of a bar may be used for reducing variations in throat heights and MR heights on a bar. However, the number of magnetic heads processed at a time is reduced in the method. It is therefore required to increase the number of lapping apparatuses. Productivity is thereby reduced.

Alternatively, the number of points of the retainer of the jig to which a bending load is applied may be increased and the number of loading mechanisms of the lapping apparatus may be increased in accordance with high-order components of the distribution pattern of throat heights and MR heights. However, since the loading mechanisms of the lapping apparatus are increased in size and complicated, it is difficult to ensure the reliability of operation of the apparatus. The system costs are increased as well.

SUMMARY OF THE INVENTION

The present invention is designed to overcome the foregoing problems. It is an object of the invention to provide a jig, fixed to a processing apparatus, for retaining an object to be processed that is long in one direction, the jig being capable of deforming the object into a complicated shape and processing the object with accuracy.

A processing jig of the invention retains an object to be processed that is long in one direction and is fixed to a processing apparatus for processing the object. The jig comprises: a main body to be fixed to the processing apparatus; a retainer that is long in one direction for retaining the object; a plurality of couplers for coupling the retainer and the main body to each other; and a plurality of load application sections, coupled to the retainer, to which a load is applied for deforming the retainer. At least one of the load application sections has a plurality of degrees of freedom.

In the processing jig of the invention, when a load is applied to the load application section, the retainer is deformed and the object to be processed retained by the retainer is thereby deformed. In the jig of the invention, at least one of the load application sections has a plurality of degrees of freedom so that the object is deformed into a more complicated shape, compared to processing with a jig wherein the load application section has only one degree of freedom.

In the processing jig of the invention, the load application section having a plurality of degrees of freedom may have three degrees of freedom in two directions orthogonal to each other and a direction of rotation. The load application section having the three degrees of freedom may have a hole capable of receiving loads in three directions whose cross section takes a shape of other than a circle.

In the processing jig of the invention, the load application section having a plurality of degrees of freedom may have two degrees of freedom in two directions orthogonal to each other. The load application section having the two degrees of freedom may have a hole capable of receiving loads in two directions whose cross section takes a shape of a circle.

The processing jig of the invention may further comprise an arm for coupling the load application section having a plurality of degrees of freedom and the retainer to each other. The arm may couple the load application section and the retainer to each other so that the center of the load application section and the center of rotation where the retainer is deformed in a direction of rotation due to a displacement of the load application section are placed in positions shifted with respect to the direction of length of the retainer.

In the processing jig of the invention, the plurality of couplers may include two end couplers for coupling both ends of the length of the retainer to the main body and at least one intermediate coupler for coupling the retainer and the main body in a position between the neighboring load application sections. The intermediate coupler may take a shape of a flexible plate whose one end is connected to the main body and the other end is connected to the retainer. The end couplers may each take a shape of a flexible plate whose one end is connected to the main body and the other end is connected to the retainer. The end couplers may each take a shape of a plate bent at a halfway point or a shape of a curved plate.

In the processing jig of the invention, three of the load application sections may be provided, two of the intermediate couplers may be provided, and the intermediate couplers and the end couplers may each take a shape of a flexible plate whose one end is connected to the main body and the other end is connected to the retainer.

In the processing jig of the invention, two of the load application sections may be provided, two of the intermediate couplers may be provided, and the intermediate couplers and the end couplers may each take a shape of a flexible plate whose one end is connected to the main body and the other end is connected to the retainer.

In the processing jig of the invention, the retainer may have a section whose thickness increases with distance from the couplers between the neighboring couplers.

In the processing jig of the invention, the main body may have a fixing section provided in only one position in the main body for fixing the main body to the processing apparatus. The fixing section may be a hole to which a fixture for fixing the main body to the processing apparatus is inserted.

In the processing jig of the invention, the main body may further include a rotation preventing section for preventing the main body from rotating about the fixing section. The rotation preventing section may include at least one engaging section in which at least one rotation preventing member provided in the processing apparatus is engaged. The engaging section may include two parallel surfaces for limiting a shift in a position of the main body with respect to the rotation preventing member in the direction of rotation about the fixing section and for allowing a shift in a position of the main body by a specific amount with respect to the rotation preventing member in the direction intersecting the direction of rotation about the fixing section.

Other and further objects, features and advantages of the invention will appear more fully from the following description.

DETAILED DESCRIPTION OF THE PREFERRED EMBODIMENTS

Figure 3:
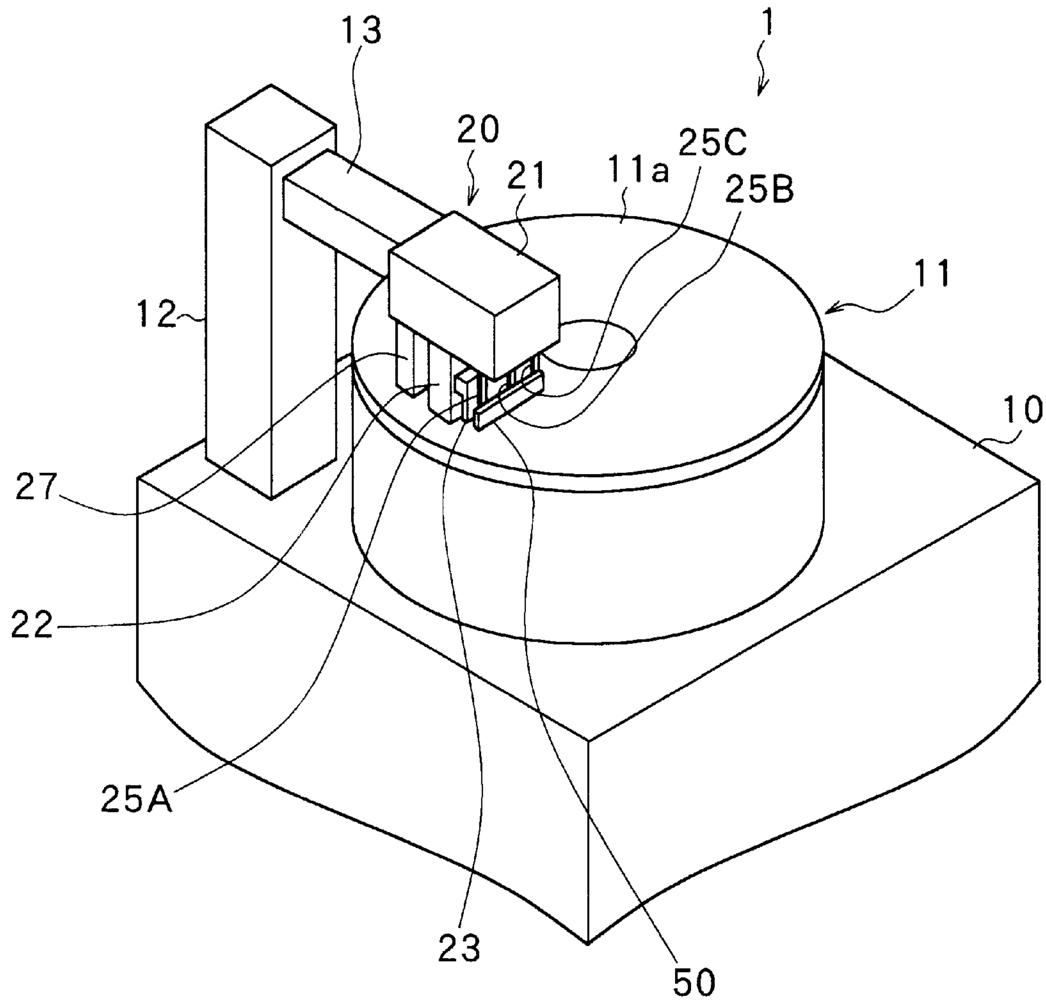
FIG.3 is a schematic perspective view of a processing apparatus wherein the jig of the first embodiment of the invention is used.

Preferred embodiments of the invention will now be described in detail with reference to the accompanying drawings. An example of a processing apparatus wherein a processing jig of a first embodiment of the invention is used will be first described. FIG. 3 is a schematic perspective view of the processing apparatus. The processing apparatus 1 is an apparatus for lapping a bar that is a magnetic head material in the shape of a bar on which sections to be sliders are arranged in a row. The processing apparatus 1 comprises: a table 10; a rotating lapping table 11 provided on the table 10; a strut 12 provided on the table 10 by the side of the rotating lapping table 11; and a material supporter 20 attached to the strut 12 through an arm 13. The rotating lapping table 11 has a lapping plate 11*a* to come to contact with a bar.

The material supporter 20 comprises: a supporter body 27 coupled to the arm 13; a base 22 placed in front of the supporter body 27; a jig retainer 23 placed in front of the base 22; and three load application rods 25A, 25B and 25C placed in front of the jig retainer 23 uniformly spaced. A cover 21 covers the upper part of the supporter body 27, the base 22 and the load application rods 25A, 25B and 25C. The base 22 is coupled through an arm not shown to an actuator provided in the supporter body 27. The base 22 is vertically movable through driving the actuator. A processing jig (simply called 'jig' in the following description) 50 of the embodiment is to be fixed to the jig retainer 23.

Figure 4:
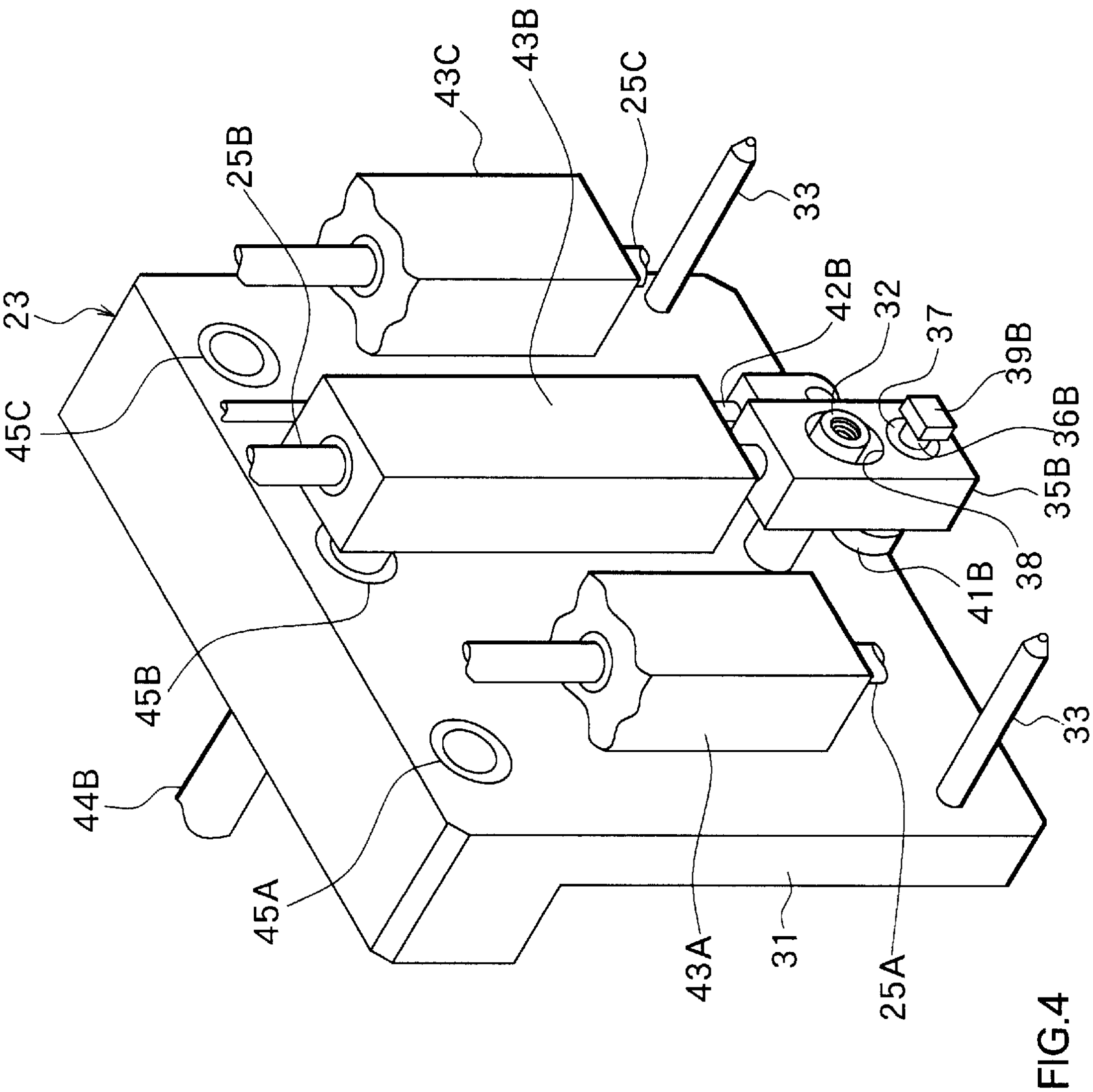
FIG.4 is a perspective view showing the neighborhood of the jig retainer shown in FIG. 3.
Figure 5:
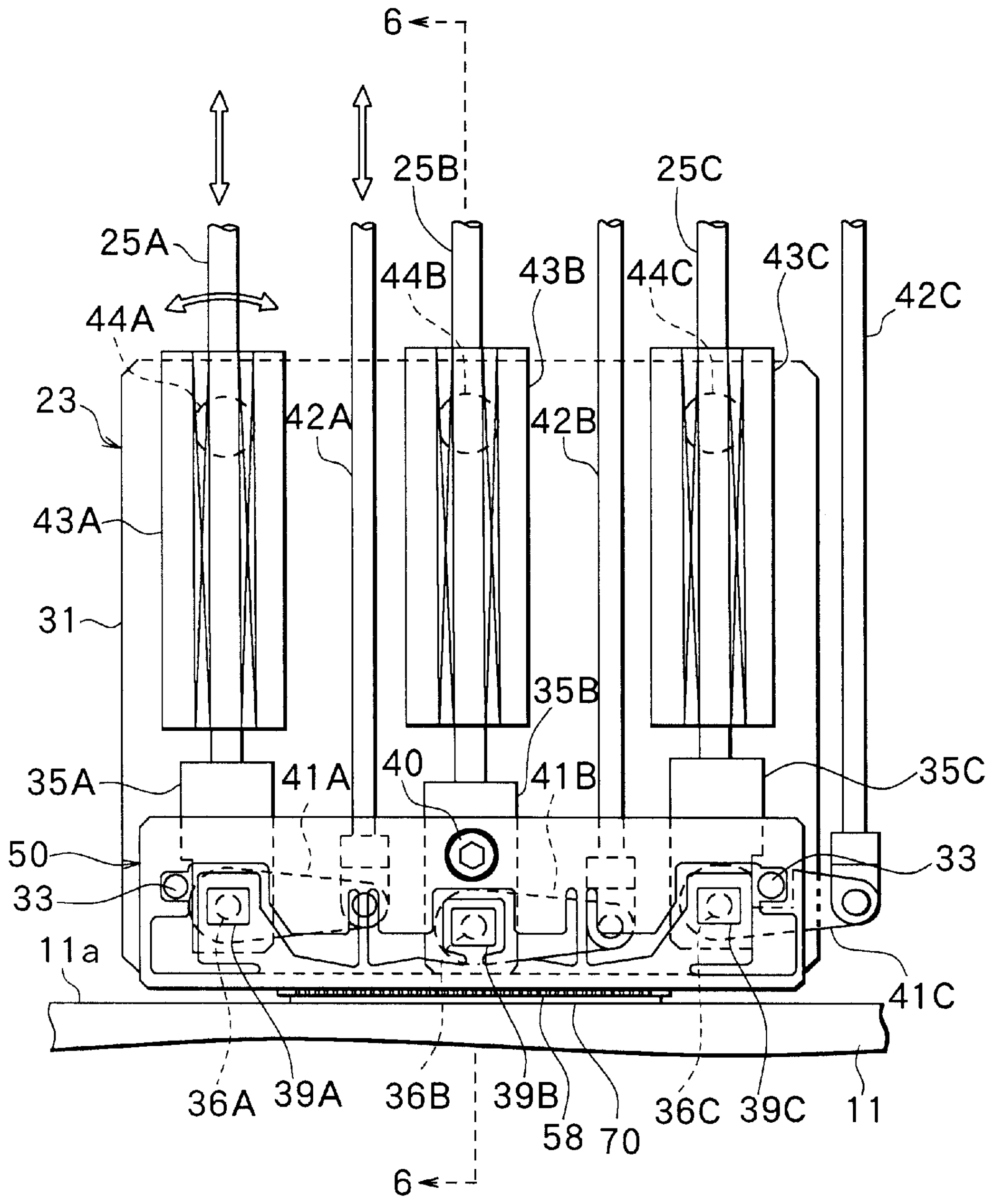
FIG. 5 is a front view of the jig of the first embodiment of the invention fixed to the jig retainer shown in FIG. 3.
Figure 6:
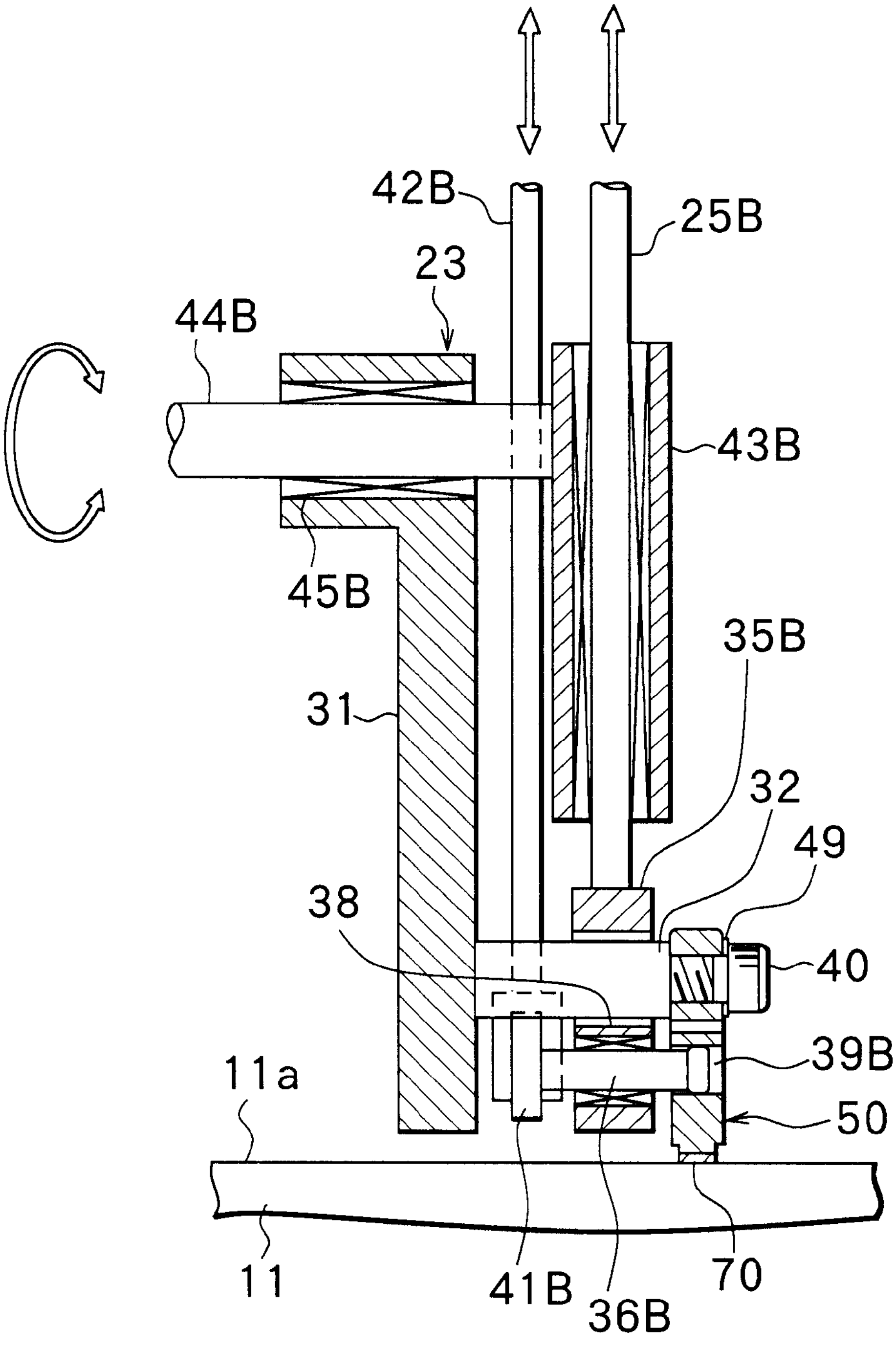
FIG. 6 is a cross section taken along line 6—6 in FIG. 5.

FIG. 4 is a perspective view showing the neighborhood of the jig retainer 23 shown in FIG. 3. FIG. 5 is a front view of the jig retainer 23 to which the jig is fixed. FIG. 6 is a cross section taken along line 6—6 of FIG. 5. The jig retainer 23 includes: a retainer body 31; a jig fixing pin 32 projecting forward, placed in front of the retainer body 31 near the lower end thereof in the middle of the horizontal length; and guide pins 33 as rotation preventing members projecting forward, each placed in front of the retainer body 31 near the lower end thereof near the end of the horizontal length. Most part of each guide pin 33 takes the shape of cylinder while the tip section of each guide pin 33 is formed such that part closer to the tip has a smaller diameter. The jig fixing pin 32 has an internal thread in the tip thereof. The jig 50 is fixed to the jig fixing pin 32 with a bolt 40 as a fixture.

Load application blocks 35A, 35B and 35C each in the shape of rectangular solid are fixed to the lower ends of the load application rods 25A, 25B and 25C, respectively. Near the lower ends of the load application blocks 35A, 35B and 35C, bearings 37 are each provided to which load application pins 36A, 36B and 36C to be described later are rotatably inserted. The load application block 35B has a hole 38 in a position corresponding to the jig fixing pin 32. The jig fixing pin 32 is inserted to the hole 38 so that the load application block 35B is movable in vertical and horizontal directions by a specific distance.

The load application pins 36A, 36B and 36C each pass through the bearings 37 of the load application blocks 35A, 35B and 35C, respectively. The tips of the load application pins 36A, 36B and 36C each project from the front face of the load application blocks 35A, 35B and 35C, respectively. Heads 39A, 39B and 39C each in the shape of rectangular solid are formed on the tips of the load application pins 36A, 36B and 36C, respectively. The lower ends of the load application pins 36A, 36B and 36C are each coupled to one end of each of levers 41A, 41B and 41C, respectively, placed between the retainer body 31 and the load application blocks 35A, 35B and 35C. The other ends of the levers 41A, 41B and 41C are each rotatably coupled to lower ends of shafts 42A, 42B and 42C for oscillating the levers 41A, 41B and 41C.

Above the load application blocks 35A, 35B and 35C, supporting members 43A, 43B and 43C are provided for supporting the load application rods 25A, 25B and 25C, respectively, so that the load application rods 25A, 25B and 25C are rotatable and vertically movable. Tips of driving rods 44A, 44B and 44C are coupled to the rear face of the supporting members 43A, 43B and 43C. The driving rods 44A, 44B and 44C pass through bearings 45A, 45B and 45C provided in the retainer body 31. The rear faces of the driving rods 44A, 44B and 44C are introduced to the base 22.

The load application rods 25A, 25B and 25C are each driven in the vertical direction by an actuator not shown provided in the base 22. The driving rods 44A, 44B and 44C are each driven in the rotational direction by another actuator not shown provided in the base 22. The shafts 42A, 42B and 42C are each driven in the vertical direction by still another actuator not shown provided in the base 22.

Figure 1A:
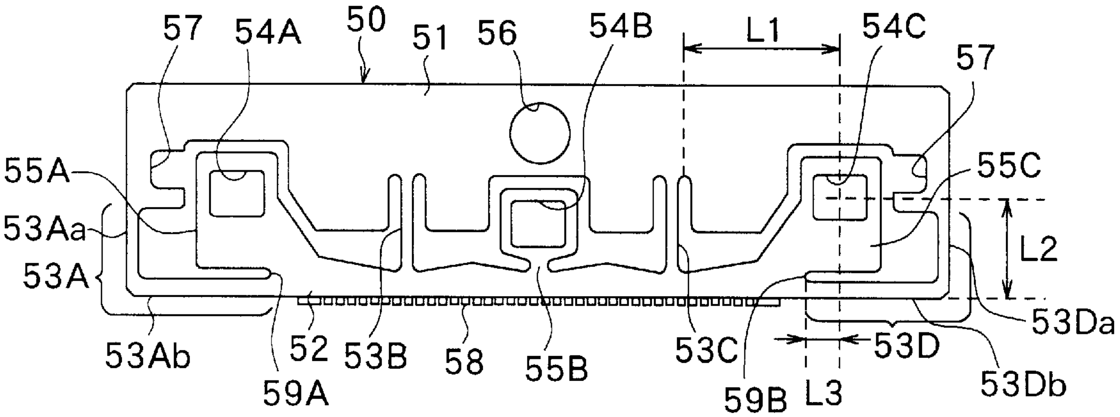
FIG. 1A is a front view of a jig of a first embodiment of the invention.
Figure 1B:
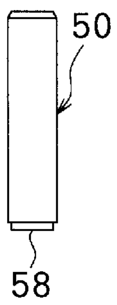
FIG. 1B is a right side view of the jig of the first embodiment of the invention.
Figure 1C:
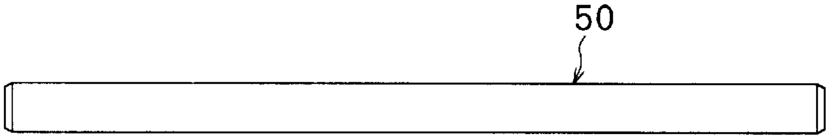
FIG. 1C is a top view of the jig of the first embodiment of the invention.
Figure 1D:
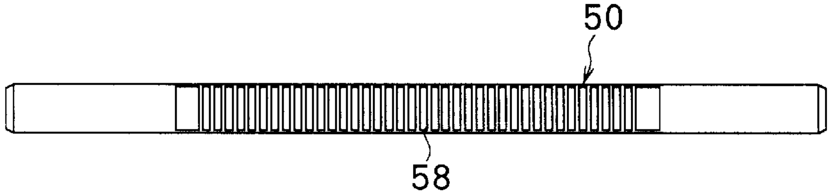
FIG. 1D is a bottom view of the jig of the first embodiment of the invention.
Figure 2:
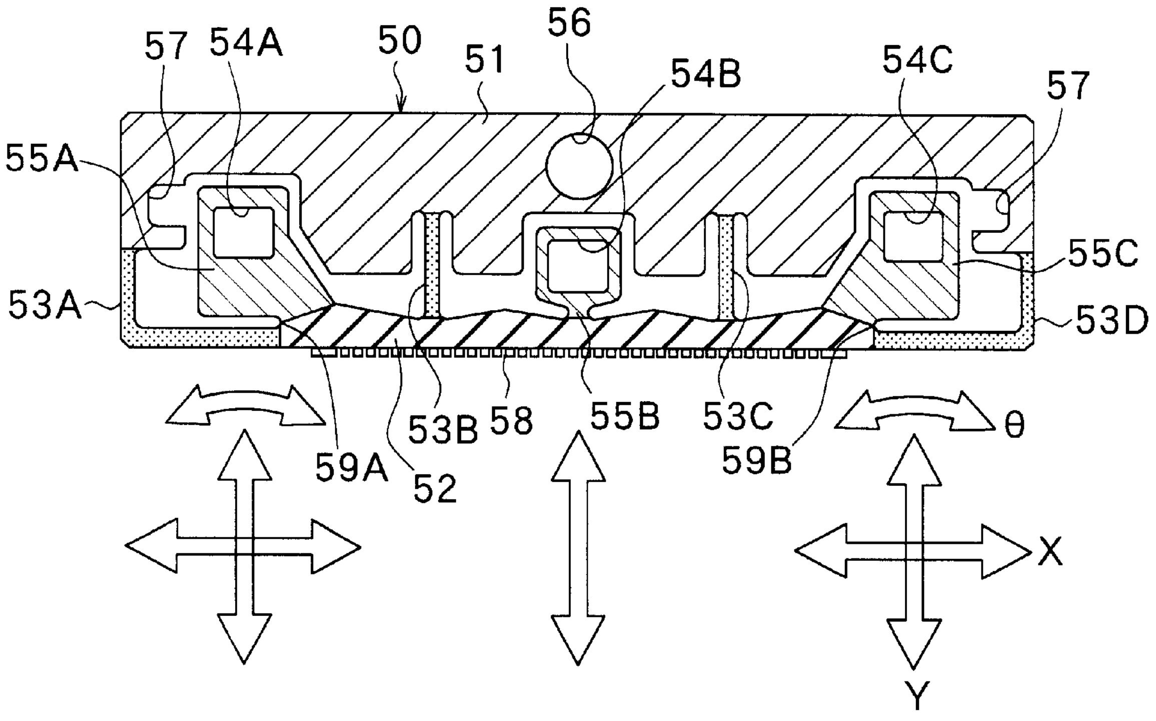
FIG. 2 an explanatory view showing the sections of the jig of the first embodiment of the invention.

Referring to FIG. 1A to FIG. 1D and FIG. 2, the structure of the jig of the embodiment will now be described. FIG. 1A is a front view of the jig. FIG. 1B is a right side view of the jig. FIG. 1C is a top view of the jig. FIG. 1D is a bottom view of the jig. As shown, the jig 50 of the embodiment comprises: a main body 51 to be fixed to the processing apparatus 1 shown in FIG. 3, for example; a retainer 52 for retaining a bar that is an object long in one direction to be processed; four couplers 53A to 53D for coupling the retainer 52 to the main body 51; three load application sections 54A to 54C, coupled to the retainer 52, to which a load is applied for deforming the retainer 52; and arms 55A to 55C for coupling the retainer 52 to the load application sections 54A to 54C. In FIG. 2, the sections of the jig 50 are shown with different hatching.

The main body 51 has a hole 56 for fixing as a fixing section in the middle of the (horizontal) length of the main body 51 and in a position above the middle of the vertical height of the main body 51. The bolt 40 is inserted to the hole 56 for fixing the main body 51 to the jig fixing pin 32 of the processing apparatus 1. The main body 51 further has engaging sections 57 in which the guide pins 33 are engaged. The engaging sections 57 are formed in positions that correspond to the guide pins 33 when the hole 56 of the jig 50 is positioned to the jig fixing pin 32 of the processing apparatus 1.

The retainer 52 takes a shape of a narrow and long beam that is bent with an application of external force. At the lower end of the retainer 52, a bar fixing section 58 is provided to which a bar is fixed. The bar fixing section 58 has a plurality of grooves where a blade for cutting a bar enters.

The jig 50 may be made of stainless steel or a ceramic such as zirconia ($ZrO_2$) or alumina ($Al_2O_3$), for example.

In the embodiment, of the four couplers 53A to 53D, the two couplers 53A and 53D are called end couplers that couple the ends (of the horizontal length) of the retainer 52 to the main body 51. The two couplers 53B and 53C are called intermediate couplers that couple the retainer 52 to the main body 51 between the neighboring load application sections.

In the embodiment, the two load application sections 54A and 54C are each placed near the end of the (horizontal) length of the main body 51 and nearly in the middle of the (vertical) height of the main body 51. The other load application section 54B is placed in the middle of the (horizontal) length of the main body 51 and in a position below the middle of the vertical height of the main body 51.

As shown in FIG. 2, the direction of length (the horizontal direction) of the jig 50 is defined as the X direction. The direction orthogonal to the direction of length of the jig 50 and parallel to the front and back of the jig 50 (the vertical direction) is defined as the Y direction. The direction of rotation about an axis orthogonal to the X and Y directions is defined as the θ direction.

The two load application sections 54A and 54C on the sides each have three degrees of freedom in the X and Y directions orthogonal to each other and the θ direction. That is, the load application sections 54A and 54C are movable in the three directions of the X and Y directions and the θ direction with respect to the main body 51. The load application section 54B in the middle has one degree of freedom in the Y direction only. That is, the load application section 54B is movable in the Y direction only with respect to the main body 51.

The load application sections 54A and 54C having three degrees of freedom each have a hole capable of receiving loads in three directions whose cross section is other than a circle. In the embodiment, the cross section of the hole is a rounded rectangle. The load application section 54B has a hole in a similar shape as well.

The two arms 55A and 55C on the sides each couple the retainer 52 to the load application sections 54A and 54C so that the centers of the load application sections 54A and 54C are shifted outside the length of the retainer 52 with respect to the centers of rotation 59A and 59B. The retainer 52 is deformed in the direction of rotation about the centers of rotation 59A and 59B by displacements of the load application sections 54A and 54C. That is, the arms 55A and 55C overhang outside the length of the retainer 52 with respect to the centers of rotation 59A and 59B.

As shown in FIG. 1A, the distance between the center of the load application section 54A or 54C and the coupler 53B or 53C is called length L1 of the arm 55A or 55C in the X direction. The distance between the center of the load application section 54A or 54C and the lower end of the retainer 52 is called length L2 of the arms 55A or 55C in the Y direction. The distance between the center of the load application section 54A or 54C and the center of rotation 59A or 59B in the X direction is called overhang length L3.

The central arm 55B is shorter in the Y direction than the other arms 55A and 55C. The arm 55B couples the load application section 54B to the middle part of the retainer 52 in the direction of length without overhanging.

The couplers 53A to 53D each take a form of a flexible plate one end of which is connected to the main body 51 and the other end of which is connected to the retainer 52. The end coupler 53A includes a section 53A*a* extending in the vertical direction and one end of which is connected to the main body 51 and a section 53A*b* extending in the horizontal direction and one end of which is connected to the other end of the section 53A*a* and the other end of which is connected to one end of the retainer 52. Similarly, the end coupler 53D includes a section 53D*a* extending in the vertical direction and one end of which is connected to the main body 51 and a section 53D*b* extending in the horizontal direction and one end of which is connected to the other end of the section 53D*a* and the other end of which is connected to one end of the retainer 52. In this way, the end couplers 53A and 53D each take a shape of a plate bent at some midpoint. The intermediate couplers 53B and 53C each take a shape of a flat plate.

In the embodiment, the thickness of part of the retainer 52 between the neighboring couplers increases with distance from the coupler. That is, the thickness of the retainer 52 between the intermediate couplers 53B and 53C is thinnest near the intermediate couplers 53B and 53C and near the arm 55B. The thickness of the retainer 52 increases in a point closer to the middle between the coupler 53B or 53C and the arm 55B. The thickness of the retainer 52 between the end coupler 53A and the intermediate coupler 53B or between the end coupler 53D and the intermediate coupler 53C is thinnest near the intermediate couplers 53B or 53C and the thickness increases in a point closer to the arm 55A or 55C.

In the embodiment, the engaging sections 57 are cut out so that the upper part of the end couplers 53A and 53D of the main body 51 are opened inwardly in the direction of length of the jig 50. The cross section of each engaging sections 57 takes a shape of a rounded rectangle. The engaging sections 57 each have two surfaces parallel to the direction of length of the jig 50. The distance between the two surfaces is slightly longer than the diameter of each guide pin 33. The guide pins 33 are each inserted to the respective engaging sections 57 with appropriate clearance in the vertical direction. By means of the two parallel surfaces, the engaging sections 57 each limits a shift in a position of the main body 51 with respect to the guide pins 33 in the direction of rotation about the hole 56. The engaging sections 57 each allows a shift in a position of the main body 51 with respect to the guide pins 33 in the direction intersecting the direction of rotation about the hole 56.

Referring to FIG. 5 and FIG. 6, the way the jig 50 is fixed to the processing apparatus 1 will now be described. A bar 70 is fixed to the bar fixing section 58 of the jig 50 through bonding and so on so that the medium facing surface of the bar 70 faces outside (faces downward). The jig 50 is placed in front of the load application blocks 35A, 35B and 35C. In this stage, the guide pins 33 are engaged in the engaging sections 57 of the jig 50. The heads 39A, 39B and 39C of the load application pins 36A, 36B and 36C are each inserted to the load application sections 54A, 54B and 54C. The position of the jig 50 is adjusted so that the position of the hole 56 of the jig 50 and the position of the jig fixing pin 32 of the processing apparatus 1 match with each other. In this state, the bolt 40 is inserted through a washer 49 to the hole 56 from the front of the jig 50. The bolt 40 is then screwed into the internal thread of the jig fixing pin 32. As a result, the jig 50 is sandwiched between the bearing surface of the bolt 40 and the tip face of the jig fixing pin 32 and the jig 50 is fixed to the jig fixing pin 32.

Referring to FIG. 5 and FIG. 6, a method of lapping the bar 70 using the processing apparatus 1 and the jig 50 will now be described. The jig 50 retaining the bar 70 is fixed to the processing apparatus 1 as described above and placed so that the surface to be processed of the bar 70 comes to contact with the lapping plate 11*a* of the rotating lapping table 11. In this state, the load application rods 25A, 25B and 25C are vertically moved and the load application blocks 35A, 35B and 35C are thereby vertically moved. The load application pins 36A, 36B and 36C passing through the load application blocks 35A, 35B and 35C are then vertically shifted. The heads 39A, 39B and 39C are vertically shifted as well. A load in the Y direction is thereby applied to each of the load application sections 54A, 54B and 54C.

If the driving rods 44A and 44C are driven in the direction of rotation, the supporting members 43A and 43C are rotated about the axes of the driving rods 44A and 44C. The lower ends of the load application rods 25A and 25C are thereby shifted in the direction of rotation about the driving rods 44A and 44C. The load application blocks 35A and 35C are then shifted in the direction of rotation about the axes of the driving rods 44A and 44C. Since the length of the shift of the load application block 35A or 35C in the direction of rotation is extremely small, compared to the distance between the driving rod 44A or 44C and the load application block 35A or 35C, the shift of the load application block 35A or 35C caused by the drive of the driving rod 44A or 44C is a nearly linear horizontal shift. The load application blocks 35A and 35C being horizontally shifted, the load application pins 36A and 36C passing through the load application blocks 35A and 35C are horizontally shifted. The heads 39A and 39C are horizontally shifted as well. A load in the X direction is thereby applied to each of the load application sections 54A and 54C.

If the shafts 42A and 42C are vertically driven, the levers 41A and 41C are oscillated. The load application pins 36A and 36C coupled to the levers 41A and 41C are thereby rotated. As a result, a moment load in the $\theta$ direction is applied to each of the load application sections 54A and 54C of the jig 50 whose center of rotation is the center of each of the load application sections 54A and 54C.

As thus described, the retainer 52, the bar fixing section 58 and the bar 70 are deformed by applying loads in various directions to the load application sections 54A, 54B and 54C. The medium facing surface of the bar 70 is thereby lapped while the throat heights and MR heights of the magnetic head elements on the bar 70 are controlled so that the target values are obtained.

Figure 7:
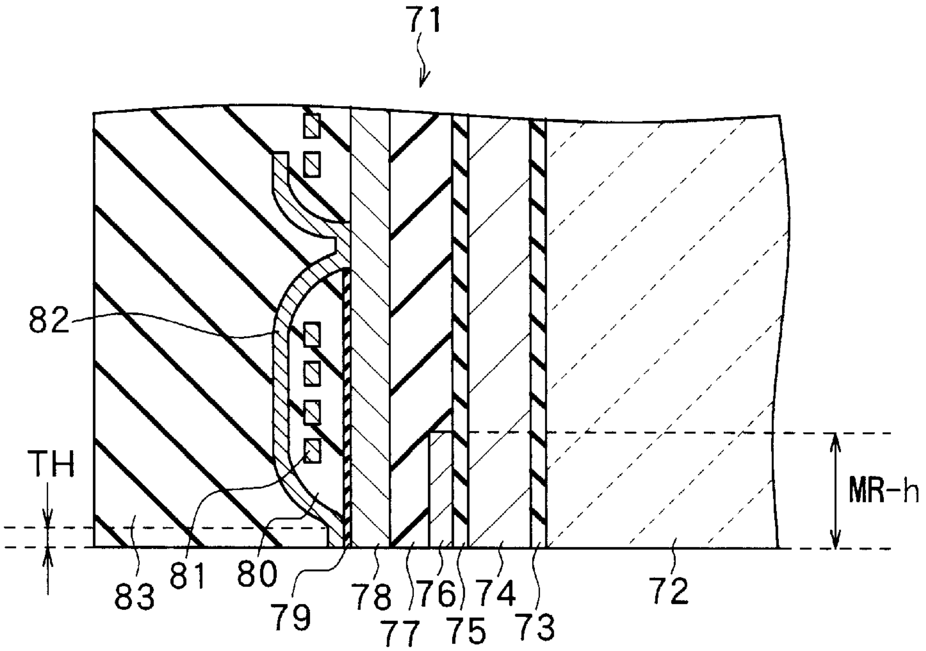
FIG. 7 is a cross section for illustrating an example of a magnetic head element.

The bar 70 is formed through cutting a wafer in one direction on which thin films are formed. The bar 70 includes a plurality of magnetic head elements arranged in a row. FIG. 7 shows a composite head as an example of a magnetic head element wherein an induction magnetic transducer for writing and an MR element for reading are stacked. A magnetic head element 71 of this example comprises a base layer 73, a lower shield layer 74, a lower insulator 75, an MR element 76 and an upper insulator 77, an upper shield-cum-lower magnetic pole 78, a gap layer 79, an insulator 80 and a coil 81, an upper magnetic pole 82 and a protection layer 83, each formed on a substrate (wafer) 72.

The substrate 72 is made of aluminum oxide and titanium carbide ($Al_2O_3$—TiC), for example. The base layer 73, the lower insulator 75, the upper insulator 77, the protection layer 83 and the gap layer 79 are made of alumina ($Al_2O_3$), for example. The lower shield layer 74, the upper shield-cum-lower magnetic pole 78 and the upper magnetic pole 82 are made of Permalloy (NiFe), for example. The insulator 80 is made of photoresist, for example. The coil 81 is made of Copper (Cu), for example.

The lower surface of the magnetic head element 71 in FIG. 7 is the surface to be lapped with the processing apparatus 1 shown in FIG. 3. While lapping, the processing apparatus 1 performs control so that throat height TH and MR height MR-h of every magnetic head element 71 included in the bar 70 fall within a certain limited tolerance. Such control is performed through observing the resistance values of an electrical lapping guide (ELG) and the MR element 76 as disclosed in Japanese Patent Application Laid-open No. Heisei 2-95572 (1990), for example. The electrical lapping guides are, for example, formed on the substrate 72 when the magnetic head element 71 is formed so as to be placed at both ends of the bar 70 along the direction of length.

Figure 8:
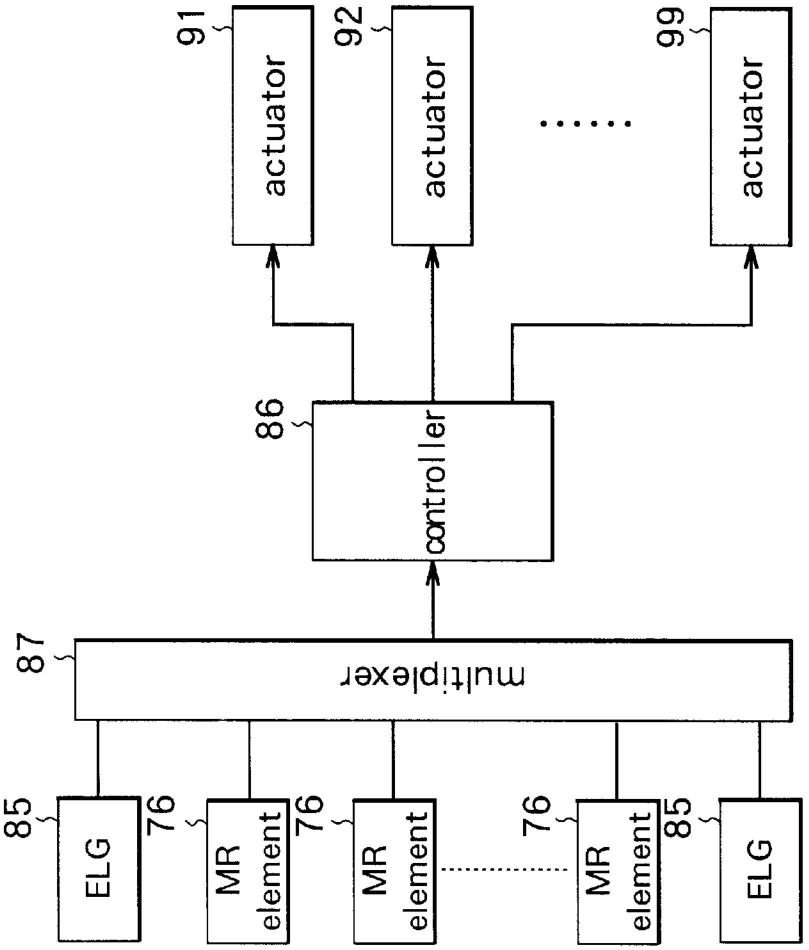
FIG. 8 is a block diagram showing an example of circuit configuration of the processing apparatus.

FIG. 8 is a block diagram showing an example of circuit configuration in a processing apparatus for controlling lapping by observing the resistance values of electrical lapping guides and MR elements as described above. The processing apparatus of this example comprises a controller 86 for controlling nine actuators 91 to 99 for applying loads to the load application sections 54A, 54B and 54C of the jig 50 through observing the resistance values of electrical lapping guides (ELG) 85 and the MR elements 76 in the bar 70; and a multiplexer 87 connected to the plurality of electrical lapping guides 85 and the MR elements 76 in the bar 70 for selectively connecting one of the electrical lapping guides 85 and the MR elements 76 to the controller 86.

In the processing apparatus, the controller 86 controls the actuators 91 to 99 through the multiplexer 87 by observing the resistance values of the electrical lapping guides 85 in the bar 70. The controller 86 first performs coarse control by observing the resistance of the electrical lapping guides 85. The controller 86 then performs control by observing the resistance of the MR elements 76 so that throat height TH and MR height MR-h of every magnetic head element 71 fall within a certain limited tolerance.

The functions and effects of the jig 50 of the embodiment of the invention will now be described in detail.

Before lapping the bar 70, although the distribution pattern of values of throat heights and MR heights of magnetic head elements on the bar 70 is a complicated pattern that may approximate to a curve of a high order, the throat heights and MR heights of the magnetic head elements throughout the bar 70 may fall within a permissible range with accuracy if the retainer 52 of the jig 50 is deformed so as to faithfully follow the pattern.

In order to deform the retainer 52 so as to faithfully follow a complicated pattern as described above, the jig 50 of the embodiment has structural features that are broadly categorized into three as follows. The first feature is that the structure of the jig 50 is such that it is theoretically possible to deform the retainer 52 into a complicated shape that may approximate to a curve of a high order by appropriately combining the number, direction and amount of loads applied to the retainer 52 of the jig 50. The second feature is that the structure of the jig 50 is such that a load applied to the jig 50 is conveyed to the sections of the jig 50 as intended and the sections of the jig 50 other than the retainer 52 interfere with deformations of the retainer 52 as little as possible. The third feature is that the structure of the jig 50 is such that local deformations of the retainer 52 due to external forces such as a reaction of the lapping plate are minimized and effects of external forces are reduced.

The first feature, that is, the structure of the jig 50 that allows the retainer 52 to be deformed into a complicated shape, will now be described. This feature is achieved by the two load application sections 54A and 54C having a plurality of degrees of freedom in the X and Y directions orthogonal to each other and the θ direction in the embodiment. In the related-art jig disclosed in U.S. Pat. No. 5,607,340, all the holes to which loads are applied are allowed to move only in the vertical direction. With such a structure, a shape of the retainer that approximates to a curve of the fourth order is only obtained by bending the retainer. In the embodiment of the invention, in contrast, the load application sections 54A and 54C have the three degrees of freedom in the X, Y and θ directions so that the load application sections 54A and 54C receive loads in the three directions of X, Y and θ. A load in the X direction applied to the load application sections 54A and 54C gives the retainer 52 a tensile load or a compressive load in the direction parallel to the length of the retainer 52. A load in the Y direction applied to the load application sections 54A and 54C gives the retainer 52 a shearing load in the direction orthogonal to the length of the retainer 52. A load in the θ direction applied to the load application sections 54A and 54C gives the retainer 52 a moment load in the direction of bending the retainer 52. The retainer 52 is deformed into a complicated shape by combining the loads in the plurality of directions applied to the load application sections 54A and 54C with a load in the Y direction applied to the load application section 54B.

Figure 9:
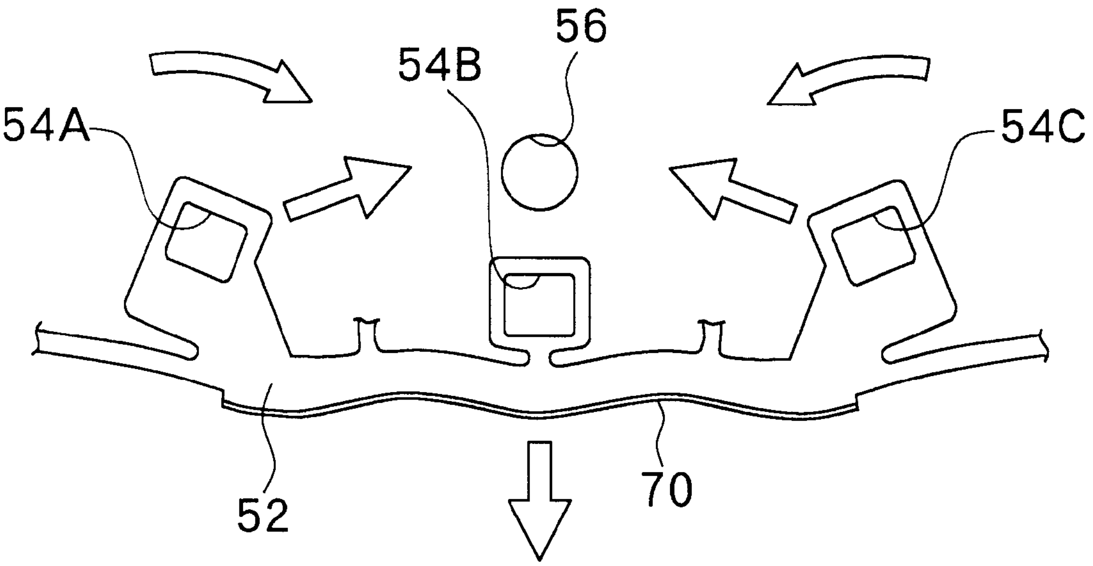
FIG. 9 is an explanatory view illustrating an example of the shape of the retainer obtained with the jig of the first embodiment of the invention.

FIG. 9 shows an example of a shape of the retainer 52 obtained by the jig 50 of the embodiment. As shown, the jig 50 achieves a complicated shape that approximates to a curve of a high order of the sixth order or above by appropriately varying the directions and amounts of the plurality of loads. Therefore, the jig 50 of the embodiment allows the bar 70 fixed to the jig 50 to bent at desired points by desired amounts within a range of shapes achieved in the retainer 52. The throat heights and MR heights of the magnetic head elements on the bar 70 are thereby controlled with high accuracy. It is thus possible to meet the demand for higher-precision throat height and MR height specifications.

The second feature will now be described. That is, the structure of the jig 50 is such that a load applied to the jig 50 is conveyed to the sections of the jig 50 as intended and the sections of the jig 50 other than the retainer 52 interfere with deformations of the retainer 52 as little as possible. The second feature includes the features of the shapes of the holes of the load application sections, the arms and the couplers.

The feature of the shapes of the holes of the load application sections is that the load application sections 54A and 54C having the three degrees of freedom each have the hole whose cross section is other than a circle that is capable of receiving loads in the three directions. Although the cross sectional shape of each hole of the load application sections 54A and 54C is a rounded rectangle in the embodiment, the shape is not limited to the rounded rectangle but may be any other shape that is capable of receiving loads in the three directions such as a different kind of rectangle, a ellipse and a cross. A hole having a circular cross section is not capable of receiving a load in the θ direction. However, such a hole having a circular cross section is acceptable if the load application sections are designed to receive loads in the two directions of X and Y only.

The cross sectional shape of each of the heads 39A and 39C of the load application pins 36A and 36C for applying loads to the load application sections 54A and 54C is suitable for each hole of the load application sections 54A and 54C and allows appropriate clearance. As a result, loads in the three directions of X, Y and θ are selectively applicable to the load application sections 54A and 54C with the heads 39A and 39C of the load application pins 36A and 36C inserted to the load application sections 54A and 54C. Since loads in the plurality of directions are simultaneously applicable to the load application sections 54A and 54C through individually controlling the amounts of loads, a complicated shape of the retainer 52 that approximates to a curve of a high order of the sixth order or above is obtained by appropriately combining the loads.

One of the features of the arms is that the jig 50 comprises the arms 55A and 55C that couple the load application sections 54A and 54C having three degrees of freedom to the retainer 52 and length L2 in the Y direction of each of the arms 55A and 55C is long to some extent. In the embodiment, length L2 is about the same as length L1 in the X direction of each of the arms 55A and 55C. This feature of the arms 55A and 55C allows the retainer 52 to be easily deformed even if the load in the X direction applied to the load application sections 54A and 54C is small.

Figure 10A:
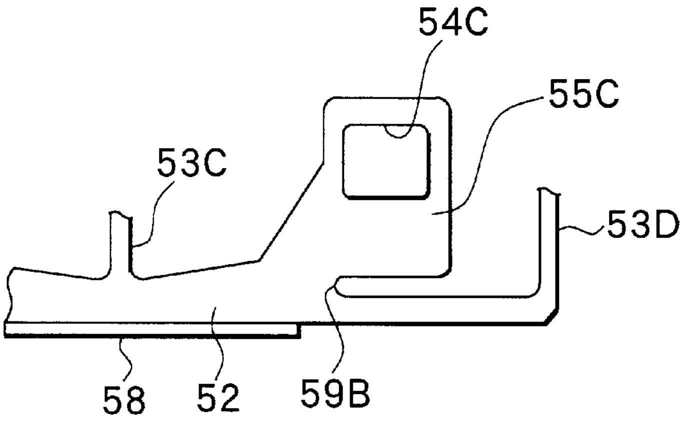
FIG. 10A, FIG. 10B and FIG. 10C are explanatory views for illustrating the function of the arm of the jig of the first embodiment of the invention.
Figure 10B:
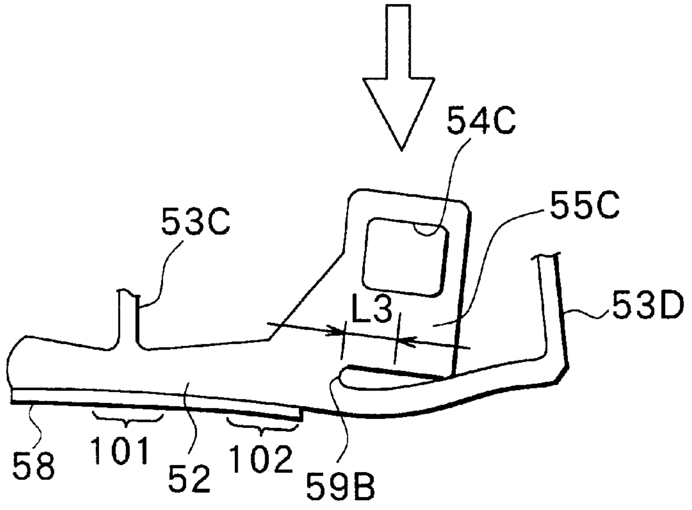
Figure 10C:
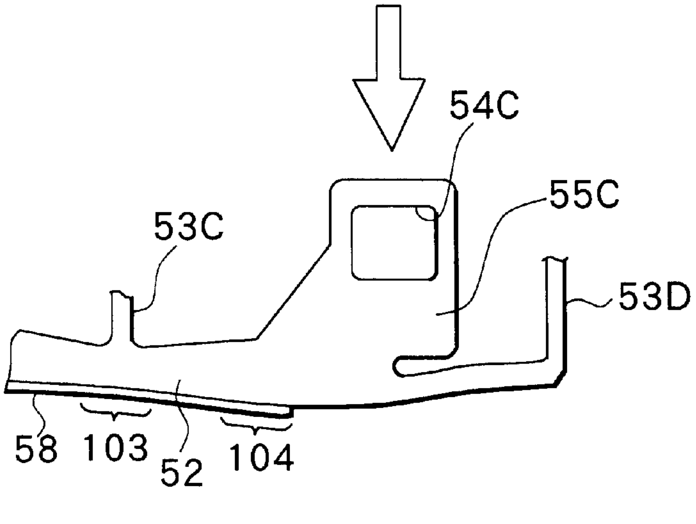

Another feature of the arms is that the arms 55A and 55C overhang outside the length of the retainer 52 with respect to the centers of rotation 59A and 59B. This structure has a function of adjusting bending near both sides of the retainer 52 so as to obtain a desired shape of the retainer 52. That is, in the retainer 52, since the section between the end coupler 53A and the intermediate coupler 53B and the section between the end coupler 53D and the intermediate coupler 53C are the twin-beam structures, the actual amounts of bending are short of the desired amounts near both ends of the retainer 52 close to the intermediate couplers 53B and 53C when a bending load is applied to the retainer 52. The overhanging arms 55A and 55C compensate the lack of amounts of bending near both ends of the retainer 52. That is, loads each applied to the load application sections 54A and 54C in the X or Y direction are transformed into moment loads about the centers of rotation 59A and 59B, respectively. The moment loads act on the neighborhood of both ends of the retainer so as to increase the amounts of bending. As a result, the amounts of bending that may be obtained with cantilevered structures are obtained in the section between the end coupler 53A and the intermediate coupler 53B and the section between the end coupler 53D and the intermediate coupler 53C of the retainer 52. Referring to FIG. 10A to FIG. 10C, the effects of the overhanging arms 55A and 55C will be further described in detail. Although the arm 55C is only shown in FIG. 10A to FIG. 10C, the same applies to the arm 55A. FIG. 10A and FIG. 10B correspond to the jig 50 of the embodiment. FIG. 10A shows the neighborhood of the arm 55C when no load is applied to the load application section 54C. FIG. 10B shows the neighborhood of the arm 55C when a downward load is applied to the load application section 54C. For comparison with the jig 50 of the embodiment, FIG. 10C shows a jig wherein the arm 55C is not overhanging, that is, overhang length L3 is zero. FIG. 10C shows the neighborhood of the arm 55C of the jig when a downward load as in FIG. 10B is applied to the load application section 54C.

In the jig 50 with the overhanging arm 55C, as shown in FIG. 10B, with an application of downward load to the load application section 54C, a bend in the shape of a concave when viewed from the surface is produced in the section near the end of the retainer indicated with numeral 102. The amount of the bend is similar to that in the section near the intermediate coupler 53C indicated with numeral 101. In contrast, as shown in FIG. 10C, with an application of downward load to the load application section 54C, a sufficient amount of bend is not obtained in the section near the end of the retainer indicated with numeral 104. As a result, the bend in the section indicated with numeral 104 is not similar to that in the section near the intermediate coupler 53C indicated with numeral 103 whose shape is a concave when viewed from the surface. Instead, the shape in the section 104 may be almost linear or a bend in the convex shape may result in some cases. It is therefore impossible to obtain a desired shape.

One of the features of the couplers is that the intermediate couplers 53B and 53C have a flexible structure with respect to a bend in the retainer 52 since the intermediate couplers 53B and 53C each take a form of a flexible plate. The flexible structure is a structure that is flexible in response to an external force so as to be easily deformed and bent when an external force is applied and to recover its original shape when the external force is removed. As a result, the structure of the intermediate couplers 53B and 53C is hard to prevent deformations of the retainer 52 when a bending load is applied to the retainer 52. That is, since the intermediate couplers 53B and 53C are long and narrow, the retainer 52 is allowed to be shifted freely to some extent in the direction of rotation and in the X direction near the intermediate couplers 53B and 53C. An abnormal local bend in the retainer 52 near the intermediate couplers 53B and 53C is thereby prevented.

Another feature of the couplers is that, since the end couplers 53A and 53D each take a form of a flexible plate, the end couplers 53A and 53D have a flexible structure with respect to a bend in the retainer 52 while maintaining the torsional rigidity of the retainer 52 at a high value. The structure of the end couplers 53A and 53D therefore does not interfere with deformations of the retainer 52. During lapping, the retainer 52 is constantly under a load in the direction orthogonal to the front and rear surfaces of the jig 50 due to friction generated by the relative motion of the bar and the lapping plate. Since the load works in the direction twisting the retainer 52 and the amount is continuously varying, the load affects the flatness of the bar after lapping.

In the jig 50 of the embodiment, since the retainer 52 has a double-end support structure with the plate-like couplers 53A to 53D, the retainer 52 exhibits high rigidity in response to torsion. This structure is advantageous to improving the flatness of the bar. On the other hand, the end couplers 53A and 53D have a flexible structure with respect to a bend in the retainer 52 since the sections 53A*a* and 53D*a* extending in the vertical direction are long and thin and the sections 53A*b* and 53D*b* extending in the horizontal direction are thin as well in end couplers 53A and 53D. As a result, with an application of a bending load to the retainer 52, a bend whose shape is similar to that obtained with a cantilevered structure is obtained.

With a double-end support beam structure wherein flexural rigidity at both ends is great, a bending amount obtained near both ends is little. Free deformations of the beam is thereby prevented. Therefore, it is difficult to control throat heights and MR heights with high accuracy with a jig of such a structure.

In contrast, the jig 50 of the embodiment exhibits high rigidity in response to torsion in the retainer 52 and has a flexible structure in response to a bend in the retainer 52. As a result, a bend whose shape corresponds to the distribution pattern of throat heights and MR heights is precisely obtained even near both ends of the bar while the flatness of the bar is maintained with enhanced accuracy.

Still another feature of the couplers is that, since the sections 53A*b* and 53D*b* extending in the horizontal direction of the end couplers 53A and 53D are thin and long to some extent, the end couplers 53A and 53D have a flexible structure with respect to a bend in the retainer 52 in combination with the sections 53A*a* and 53D*a* extending in the vertical direction that are thin and long to some extent and with the intermediate couplers 53B and 53C. The structure does not interfere with deformations of the retainer 52. As a result, with an application of a bending load to the retainer 52, a bend whose shape is similar to that obtained with a cantilevered structure is obtained although the structure is actually a double-end support structure. A bend whose shape corresponds to the distribution pattern of throat heights and MR heights is thus precisely obtained even near both ends of the bar.

The third feature will now be described. That is, the structure of the jig 50 is such that local deformations of the retainer 52 due to external forces such as a reaction of the lapping plate are minimized and effects of external forces are reduced. This feature is achieved by the retainer 52 having the section between the neighboring couplers whose thickness increases with distance form the couplers.

Lapping of the bar is performed with the bar pressed against the lapping plate by means of the retainer 52 of the jig 50. This means that the whole retainer 52 constantly receives a reaction of the lapping plate. Due to the reaction, the section between the neighboring couplers of the retainer 52 is slightly deformed in the direction escaping from the lapping plate during lapping.

In the jig 50 of the embodiment, in order to overcome the problem, the retainer 52 has the section between the neighboring couplers whose thickness increases with distance form the couplers as described above. Consequently, the bending rigidity of the retainer 52 increases with distance form the couplers. As a result, the amount of escaping from the lapping plate is minimized even in the section of the retainer 52 away from the couplers. The shape of a bend in the retainer 52 close to a desired shape is thus obtained. More precise control of throat heights and MR heights is thereby achieved.

According to the jig 50 of the embodiment described so far, the retainer 52 is precisely deformed into a complicated shape that corresponds to the distribution pattern of throat heights and MR heights of magnetic head elements on the bar. The bar is thereby lapped with accuracy. The throat heights and MR heights throughout the bar thus fall within a permissible range.

The jig 50 of the embodiment further improves the flatness of the medium facing surface of the bar and stabilizes the floating amount of the sliders through the features of the fixing section and rotation preventing section.

The feature of the fixing section will now be described. The jig 50 of the embodiment comprises the hole 56 for fixing as the fixing section in the middle of the (horizontal) length of the main body 51. The bolt 40 is inserted to the hole 56 for fixing the main body 51 to the jig fixing pin 32 of the processing apparatus 1. The jig 50 is fixed to the jig fixing pin 32 of the processing apparatus 1 with the bolt 40 only at the one point in the middle of the length of the main body 51.

In the related-art method for fixing the jig to the processing apparatus at a plurality of points, the jig is deformed when the screws for fixing the jig are fastened if the mount surface has a slight waviness or a difference in level or a foreign substance is placed between the surface and the jig. If the deformed jig is mounted on the processing apparatus and the jig is detached from the apparatus after lapping, the jig returns to the previous state with no load. Consequently, the flatness of the medium facing surface of the bar is different from that of during lapping. The flatness is thus reduced.

In the embodiment, in contrast, the jig 50 is fixed to the jig fixing pin 32 of the processing apparatus 1 only at the one point. The mount surface of the jig 50 is therefore the small region of the tip of the jig fixing pin 32 only. As a result, with the bolt 40 fastened, a deformation of the jig 50 is minimized. When the jig 50 is removed from the processing apparatus 1 after lapping, the flatness of the medium facing surface of the bar hardly changes compared to the bar before removed from the processing apparatus 1. Required accuracy is thereby maintained.

The flatness of the medium facing surface of the bar affects the flatness of the medium facing surface of the individual sliders obtained through cutting the bar. The flatness of the medium facing surface of the slider affects the floating a mount of the slider. The properties of the magnetic head is thereby affected. That is, it is required to obtain a bar with the medium facing surface of high flatness for obtaining a magnetic head with stable properties. The jig 50 and the processing apparatus 1 of the embodiment prevent deformations of the jig 50 when the jig 50 is attached to or detached from the apparatus 1 and stabilize the floating amount of the sliders and the properties of the magnetic heads.

The feature of the rotation preventing section will now be described. Since the jig 50 is fixed to the jig fixing pin 32 of the processing apparatus 1 only at the one point in the embodiment as described above, a force is applied to the jig 50 in the direction of rotating the bolt 40 when the bolt 40 is fastened. The jig 50 would be rotated without any mechanism for preventing a rotation of the jig 50.

The jig 50 of the embodiment comprises the engaging sections 57 in which the guide pins 33 of the processing apparatus 1 are engaged. By inserting the guide pins 33 to the engaging sections 57 with appropriate clearance, a rotation and a shift of the jig 50 when the jig 50 is fixed to the apparatus 1 are prevented.

The engaging sections 57 each have the two surfaces parallel to the direction of length of the jig 50. By means of the two parallel surfaces, the engaging sections 57 each limit a shift in a position of the main body 51 with respect to the guide pins 33 in the direction of rotation about the hole 56. The engaging sections 57 each allow a shift in a position of the main body 51 with respect to the guide pins 33 in the direction intersecting the direction of rotation about the hole 56.

If the engaging sections 57 do not have such a function of allowing a shift in a position, the jig 50 being deformed is fixed to the processing apparatus 1 if there is a shift in positions of the guide pins 33 and the engaging sections 57. When the jig is detached from the apparatus after lapping, the jig returns to the previous state with no load. Consequently, the flatness of the medium facing surface of the bar is different from that during lapping. The flatness is thus reduced.

In the embodiment, a shift in a position of the main body 51 by a specific amount is allowed with respect to the guide pins 33 in the direction intersecting the direction of rotation about the hole 56. Deformations of the jig 50 is thereby prevented and required accuracy of the flatness of the medium facing surface of the bar is maintained.

It has been known that damage such as scratches and chips may result on the surface of a jig in contact with the processing apparatus. Such damage reduces the quality of magnetic heads fixed to the jig to be processed. The jig 50 of the embodiment has a symmetrical shape and has no right-side up. As a result, if any damage is found on one side of the jig 50, the other side is placed to face the processing apparatus. It is thus possible to improve the quality and yields of magnetic heads and to prolong the lifetime of the jig 50.

Figure 11:
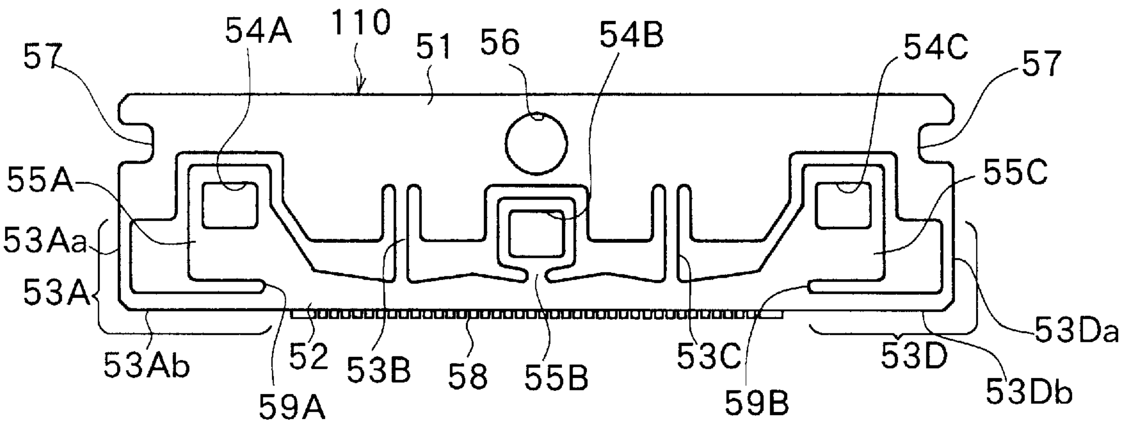
FIG. 11 is a front view of a modification example of a jig of the first embodiment of the invention.

FIG. 11 is a front view of a jig of a modification example of the embodiment. The jig 110 is similar to the jig 50 shown in FIG. 1 except the positions of the engaging sections 57. That is, the engaging sections 57 of the jig 110 are cut out so that the upper part of the end couplers 53A and 53D of the main body 51 are opened outwardly in the direction of length of the jig 50. The cross section of each engaging section 57 takes a shape of a rounded rectangle. The engaging sections 57 each have two surfaces parallel to the direction of length of the jig 110. The distance between the two surfaces is slightly longer than the diameter of each guide pin 33. The guide pins 33 are placed in positions corresponding to the engaging sections 57. The remainder of configuration, functions and effects of the jig 110 are similar to those of the jig 50.

Figure 12:
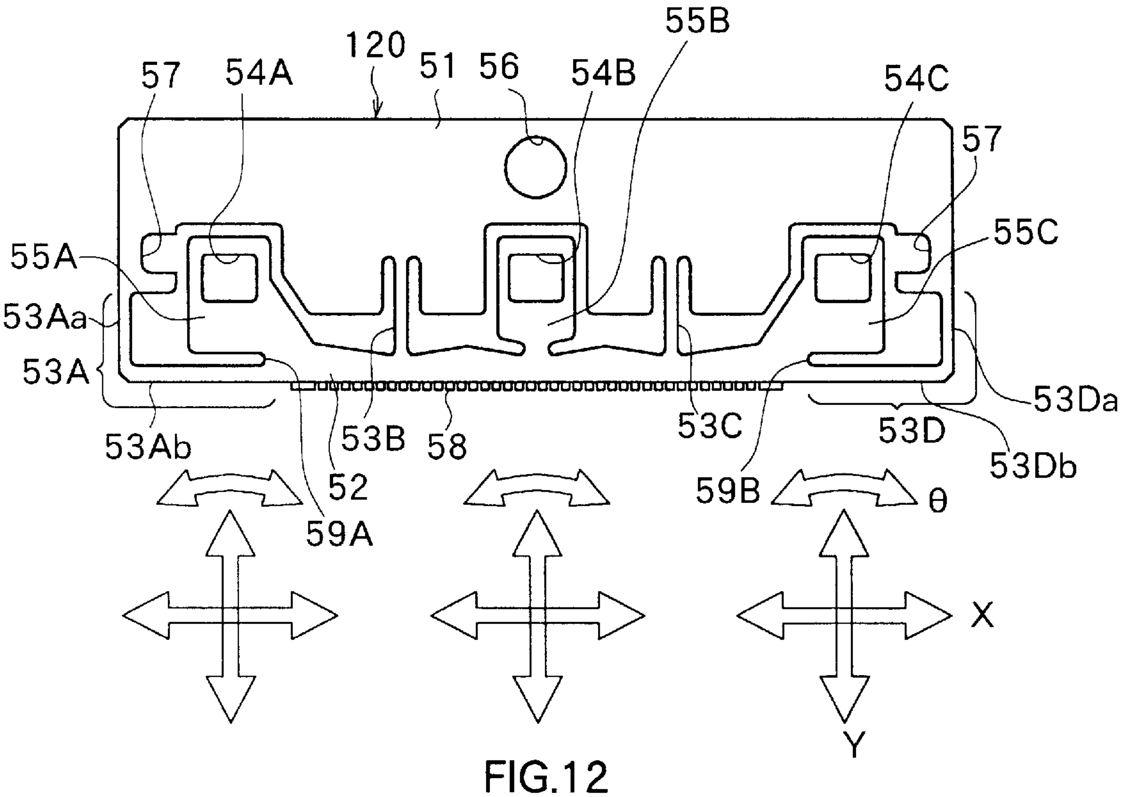
FIG. 12 is a front view of a jig of a second embodiment of the invention.
Figure 13:
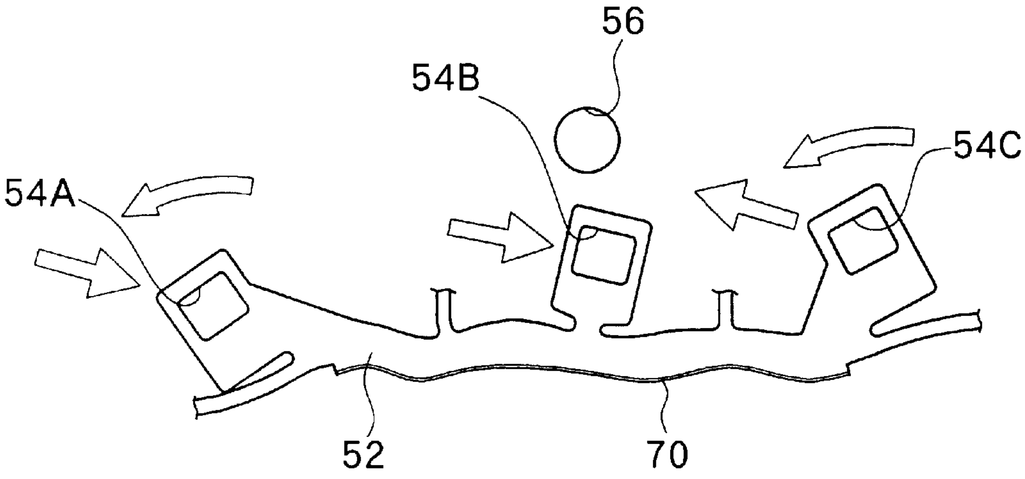
FIG. 13 is an explanatory view illustrating an example of the shape of the retainer obtained with the jig of the second embodiment of the invention.
Figure 14:
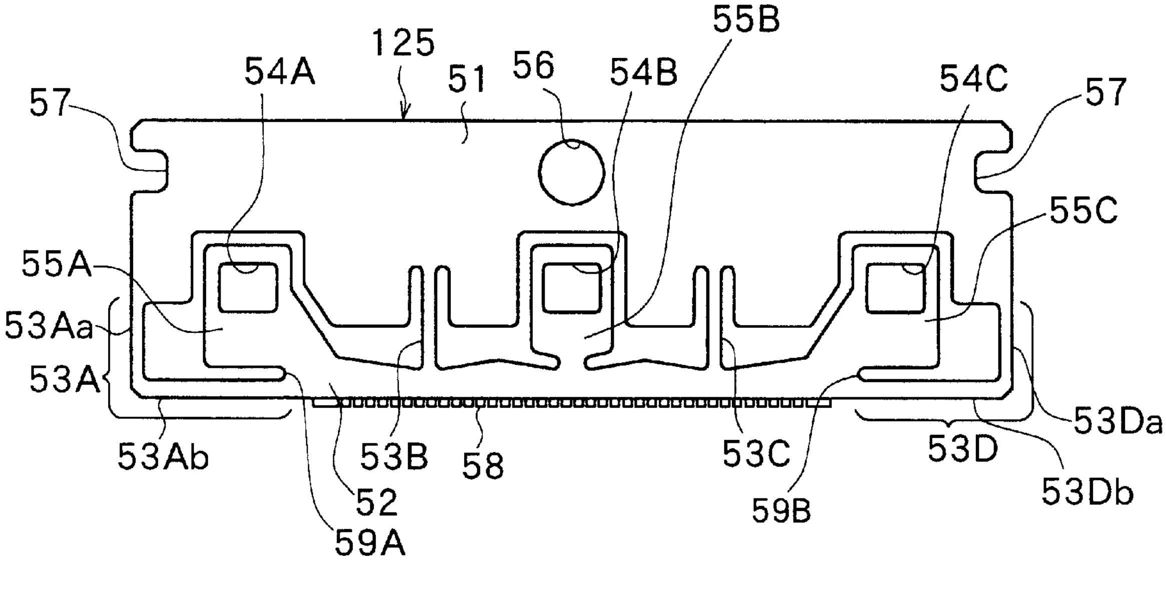
FIG. 14 is a front view of a modification example of a jig of the second embodiment of the invention.

Referring to FIG. 12 to FIG. 14, a jig of a second embodiment of the invention will now be described. FIG. 12 is a front view of the jig of the second embodiment. Compared to the jig 50 of the first embodiment, the jig 120 is longer in the vertical direction. In the jig 120, the load application section 54B in the middle is placed higher than the load application section 54B of the jig 50. As the other load application sections 54A and 54C, the load application section 54B is placed almost in the middle of the vertical height of the main body 51. Accordingly, the arm 55B of the jig 120 is longer than the arm 55B of the jig 50.

In the jig 120 of the embodiment, the three load application sections 54A, 54B and 54C all have three degrees of freedom in the X and Y directions orthogonal to each other and the θ direction. That is, the load application sections 54A to 54C are movable in the three directions of the X and Y directions and the θ direction with respect to the main body 51.

The jig 120 of the embodiment may be used in the processing apparatus 1 shown in FIG. 3 to FIG. 6. In this case, if the driving rod 44B is driven in the direction of rotation, the supporting member 43B is rotated about the driving rod 44B. The lower ends of the load application rod 25B is thereby shifted in the direction of rotation about the driving rod 44B. The load application block 35B is then shifted in the direction of rotation about the driving rod 44B. The load application pin 36B passing through the load application block 35B is thereby horizontally shifted. The head 39B is horizontally shifted as well. A load in the X direction is thereby applied to the load application section 54B of the jig 120.

If the shaft 42B is vertically driven, the lever 41B is oscillated. The load application pin 36B coupled to the lever 41B is thereby rotated. As a result, a moment load in the θ direction is applied to the load application section 54B of the jig 120 whose center of rotation is the center of the load application section 54B.

According to the jig 120 of the embodiment, the retainer 52 is deformed into a more complicated shape, compared to the jig 50 of the first embodiment, by combining loads in a plurality of directions applied to the three load application sections 54A to 54C.

FIG. 13 shows an example of a shape of the retainer 52 obtained by the jig 120 of the embodiment. As shown, the jig 120 achieves a complicated shape that approximates to a curve of a high order of the eighth order or above by appropriately varying the directions and amounts of the plurality of loads. Therefore, the jig 120 of the embodiment achieves highly precise control of throat heights and MR heights throughout a bar that is longer than 50 mm, for example. Processing of a number of magnetic heads at one time is therefore achieved and productivity is improved. The throat heights and MR heights of a bar of about 50 mm in length are controlled with higher accuracy, compared to the first embodiment. It is thus possible to meet the demand for higher-precision throat height and MR height specifications.

The remainder of configuration, functions and effects of the embodiment are similar to those of the first embodiment.

FIG. 14 is a front view of a jig of a modification example of the embodiment. The jig 125 is similar to the jig 120 shown in FIG. 12 except the positions of the engaging sections 57. That is, the engaging sections 57 of the jig 125 are cut out so that the upper part of the end couplers 53A and 53D of the main body 51 are opened outwardly in the direction of length of the jig 50. The engaging sections 57 of the jig 125 are similar to the engaging sections 57 of the jig 120 shown in FIG. 12. The remainder of configuration, functions and effects of the jig 125 are similar to those of the jig 120.

Figure 15:
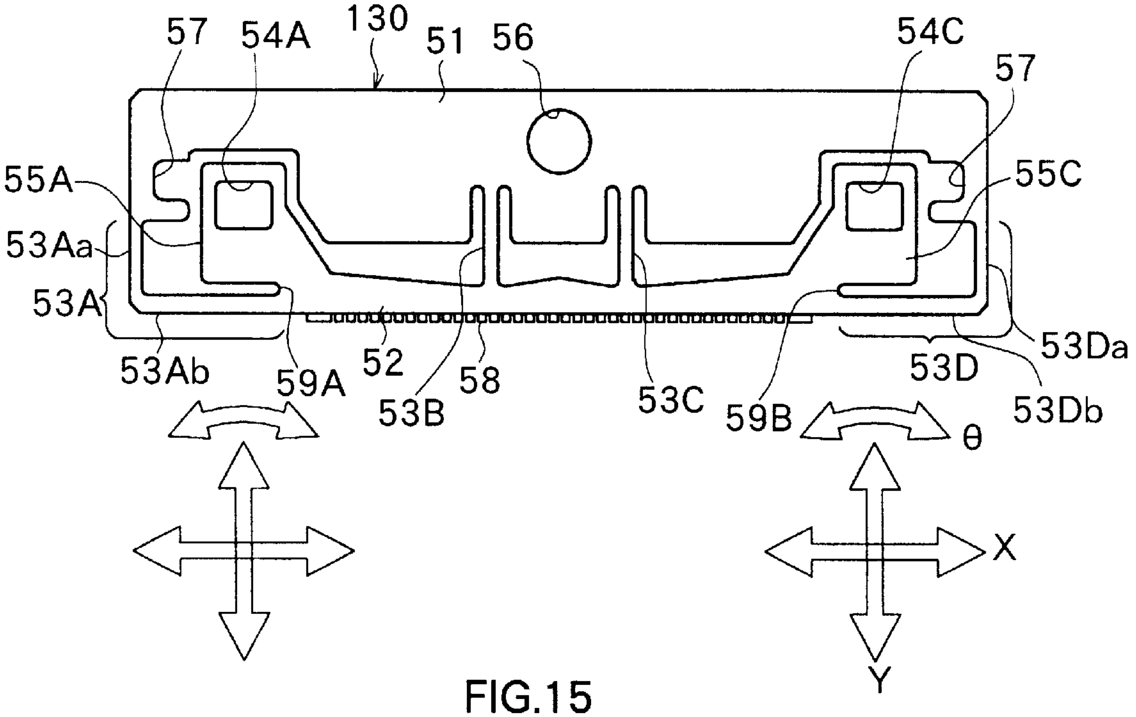
FIG. 15 is a front view of a jig of a third embodiment of the invention.
Figure 16:
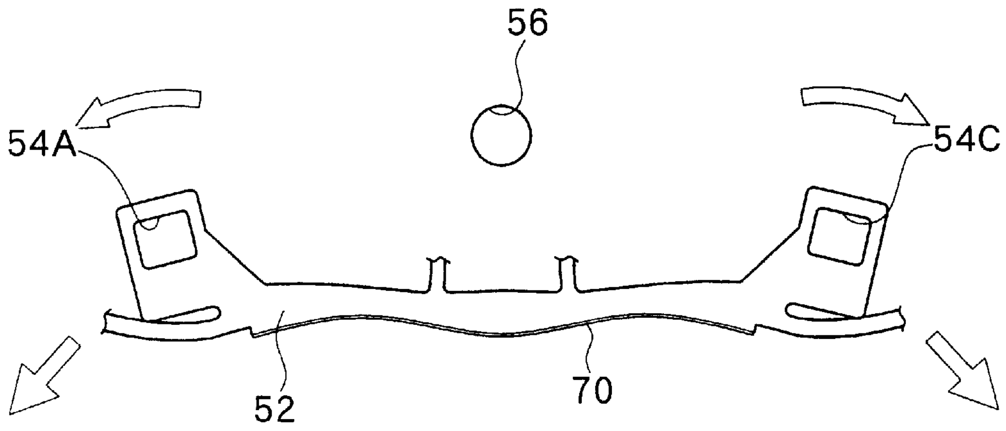
FIG. 16 is an explanatory view of a modification example of a jig of the third embodiment of the invention.
Figure 17:
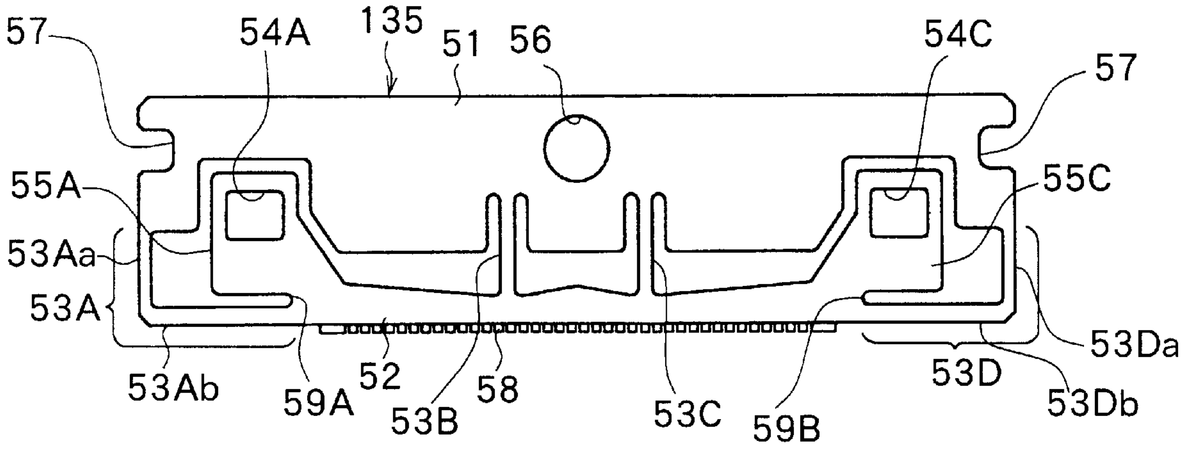
FIG. 17 is a front view of a modification example of a jig of the third embodiment of the invention.

Referring to FIG. 15 to FIG. 17, a jig of a third embodiment of the invention will now be described. FIG. 15 is a front view of the jig of the third embodiment. The jig 130 of the embodiment is similar to the jig 50 of the first embodiment except that the load application section 54B and the arm 55B are removed and the intermediate couplers 53B and 53C are shifted to positions closer to the center. Between the intermediate couplers 53B and 53C, the retainer 52 of the jig 130 is thinnest near the intermediate couplers 53B and 53C and the thickness increases in a position closer to the middle between the intermediate couplers 53B and 53C and the bending rigidity is enhanced.

The jig 130 of the embodiment may be used in the processing apparatus 1 shown in FIG. 3 to FIG. 6 wherein the load application pin 36B in the middle is removed.

According to the jig 130 of the embodiment, the retainer 52 is deformed into a complicated shape by combining loads in a plurality of directions applied to the two load application sections 54A and 54C.

FIG. 16 shows an example of a shape of the retainer 52 obtained by the jig 130 of the embodiment. As shown, the jig 130 achieves a complicated shape that approximates to a curve of the fourth order or above by appropriately varying the directions and amounts of the plurality of loads. Therefore, compared to the relater-art jig with three load application sections, the jig 130 of the embodiment achieves a complicated shape of the retainer 52 that approximates to a curve of an order higher than the fourth order obtained with the related-art jig while the number of the load application sections is reduced.

The remainder of configuration, functions and effects of the embodiment are similar to those of the first embodiment.

FIG. 17 is a front view of a jig of a modification example of the embodiment. The jig 135 is similar to the jig 130 shown in FIG. 15 except the positions of the engaging sections 57. That is, the engaging sections 57 of the jig 135 are cut out so that the upper part of the end couplers 53A and 53D of the main body 51 are opened outwardly in the direction of length of the jig 50. The engaging sections 57 of the jig 135 are similar to the engaging sections 57 of the jig 110 shown in FIG. 11. The remainder of configuration, functions and effects of the jig 135 are similar to those of the jig 130.

Figure 18A:
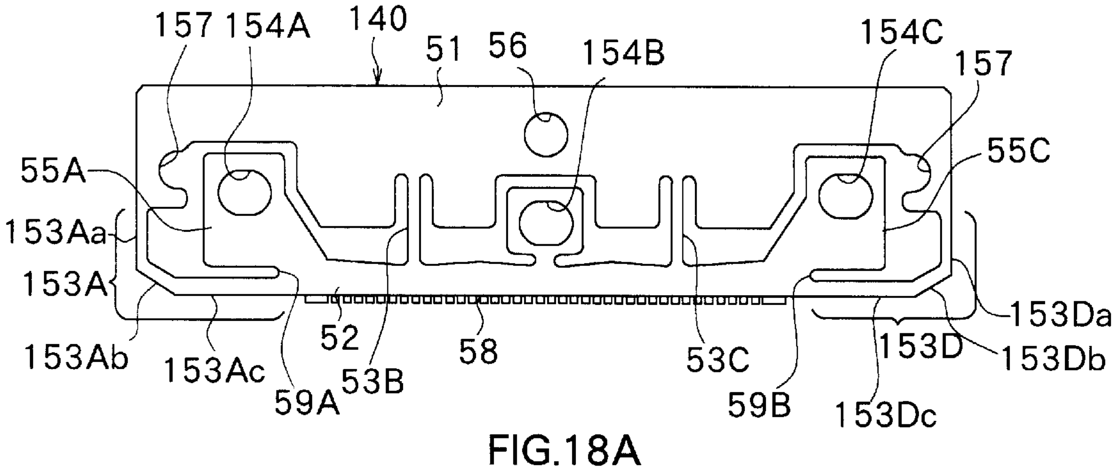
FIG. 18A is a front view of a jig of a fourth embodiment of the invention.
Figure 18B:
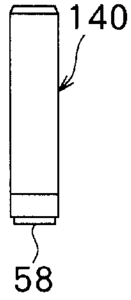
FIG. 18B is a right side view of the jig of the fourth embodiment of the invention.
Figure 18C:
FIG. 18C is a top view of the jig of the fourth embodiment of the invention.
Figure 18D:
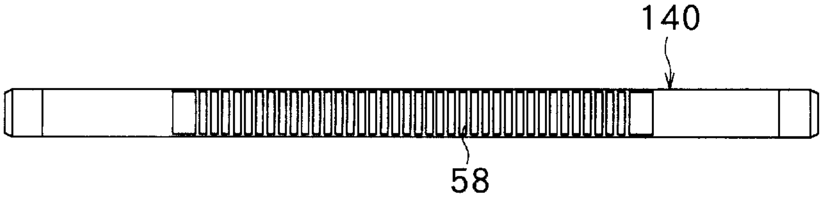
FIG. 18D is a bottom view of the jig of the fourth embodiment of the invention.

Referring to FIG. 18A to FIG. 22, a jig of a fourth embodiment of the invention will now be described. FIG. 18A is a front view of the jig of the fourth embodiment. FIG. 18B is a right side view of the jig. FIG. 18C is a top view of the jig. FIG. 18D is a bottom view of the jig. As shown, the jig 140 of the embodiment has the end couplers each bent at two halfway points. The jig 140 comprises end couplers 153A and 153D instead of the end couplers 53A and 53D of the jig 50 of the first embodiment. The end coupler 153A includes a section 153A*a* extending in the vertical direction and one end of which is connected to the main body 51, a section 153A*c* extending in the horizontal direction and one end of which is connected to one end of the retainer 52, and a section 153A*b* extending in the diagonal direction that connects the other ends of the sections 153A*a* and 153A*c* to each other. Similarly, the end coupler 153D includes a section 153D*a* extending in the vertical direction and one end of which is connected to the main body 51, a section 153D*c* extending in the horizontal direction and one end of which is connected to one end of the retainer 52, and a section 153D*b* extending in the diagonal direction that connects the other ends of the sections 153D*a* and 153D*c* to each other.

The functions of the end couplers 153A and 153D will now be described. The end couplers 153A and 153D have a function of conveying the bend in the Y direction generated in the retainer 52 to both ends of the jig 140 without regulating the bend in the Y direction in the retainer and efficiently transforming the bend into a bend in the X direction. That is, the structure of the end couplers 153A and 153D is such that the sections 153A*c* and 153D*c* extending in the horizontal direction are connected to the sections 153A*a* and 153D*a* extending in the vertical direction through the sections 153A*b* and 153D*b* extending in the diagonal direction. Consequently, the extending direction of the sections of the end couplers 153A and 153D changes step by step. As a result, the bend in the Y direction generated in the retainer 52 is changed in direction step by step and conveyed to both ends of the jig 140 and efficiently transformed into a bend in the X direction.

Since there is no abrupt bend or change in thickness in the end couplers 153A and 153D each made up of the three sections 153A*a* to 153A*c* and 153D*a* to 153D*c*, respectively, no stress is applied to any particular point in the end couplers 153A and 153D. A fracture of the jig 140 when used is therefore prevented.

Instead of the load application sections 54A to 54C of the jig 50 of the first embodiment, the jig 140 of the embodiment comprises load application sections 154A to 154C each of which has a cross section in the shape of an ellipse that is long in the horizontal direction. Instead of the engaging sections 57 of the jig 50, the jig 140 comprises engaging sections 157 each of which has a cross section in the shape of part of an ellipse that is long in the horizontal direction.

Figure 19A:
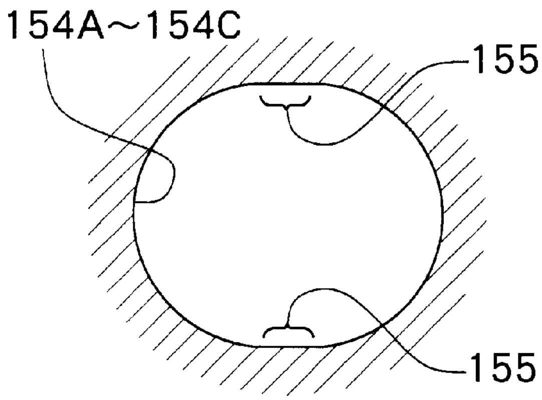
FIG. 19A, FIG. 19B and FIG. 19C are explanatory views for enlarging the holes of the load application sections of the jig of a fourth embodiment of the invention.
Figure 19B:
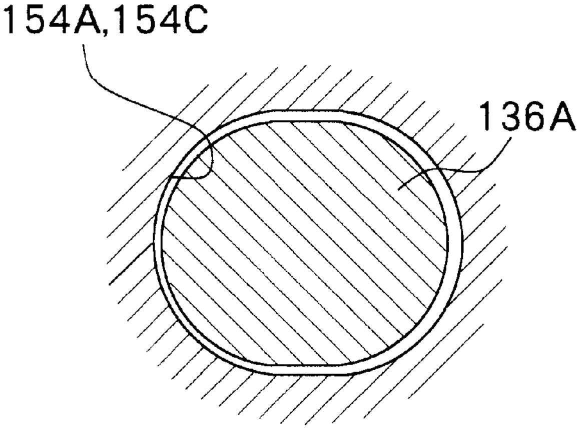
Figure 19C:
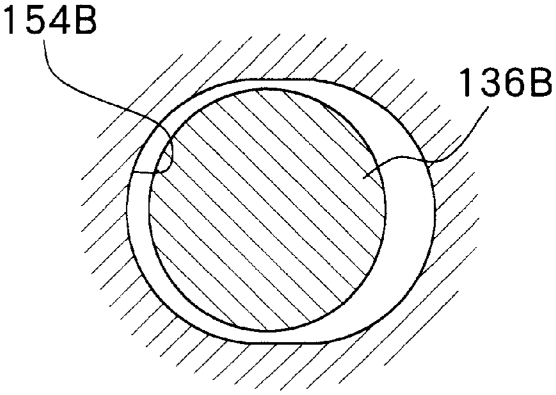

FIG. 19A illustrates each hole of the load application sections 154A to 154C enlarged. As shown, each hole of the load application sections 154A to 154C has two surfaces 155 parallel to the length of the jig 140. As shown in FIG. 19B, a load application pin 136A, for example, is inserted to each hole of the load application sections 154A and 154C having three degrees of freedom. The load application pin 136A has a cross section in the shape of an ellipse that is long in the horizontal direction and allows appropriate clearance with respect to the hole. By driving the load application pin 136A in the X, Y and θ directions, loads in the X, Y and θ directions are applied to the load application sections 154A and 154C. As shown in FIG. 19C, a load application pin 136B, for example, is inserted to the hole of the load application section 154B having a degree of freedom in the Y direction only. The load application pin 136B has a cross section in the shape of a circle and allows appropriate clearance in the vertical direction with respect to the hole. By driving the load application pin 136B in the Y direction, a load in the Y direction is applied to the load application section 154B. The hole of the load application section 154B allows a shift in a position of the load application pin 136B in the horizontal direction by a specific amount.

Figure 20A:
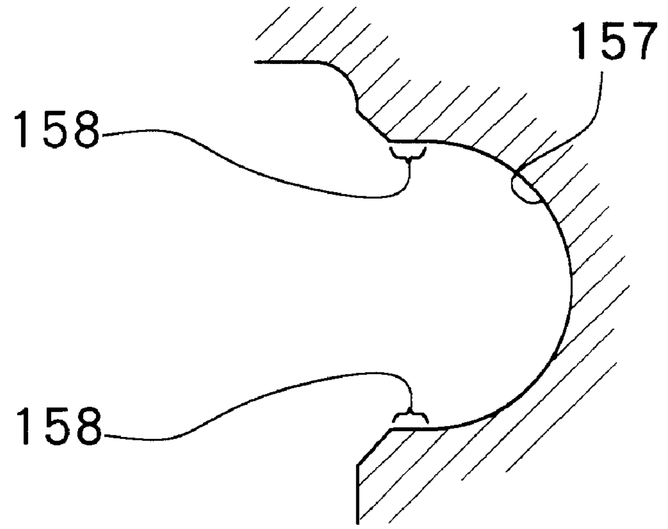
FIG. 20A and FIG. 20B are explanatory views for enlarging the engaging section of the jig of the fourth embodiment of the invention.
Figure 20B:
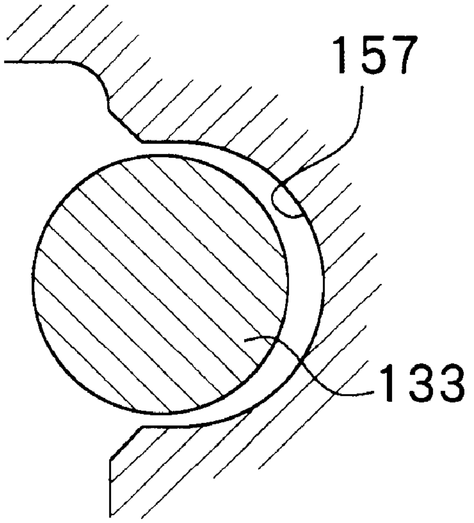

FIG. 20A shows the enlarged engaging section 157. As shown, the engaging section 157 has two surfaces 158 parallel to the length of the jig 140. As shown in FIG. 20B, a guide pin 133, for example, is inserted to the engaging section 157. The guide pin 133 has a cross section in the shape of a circle and allows appropriate clearance in the vertical direction with respect to the engaging section 157. In this case, by means of the two parallel surfaces 158, the engaging sections 157 each limit a shift in a position of the main body 51 with respect to the guide pins 133 in the direction of rotation about the hole 56 of the jig 140. The engaging sections 157 each allow a shift in a position of the main body 51 by a specific amount with respect to the guide pins 133 in the direction intersecting the direction of rotation about the hole 56.

Figure 21:
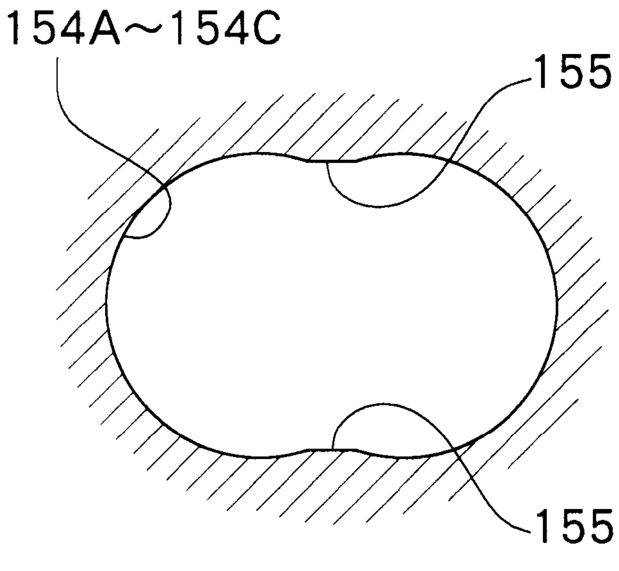
FIG. 21 is an explanatory view for showing another example of the shape of the hole of the load application sections of the jig of the fourth embodiment of the invention.

FIG. 21 shows another example of the shape of the holes of the load application sections 154A to 154C. In this example, the hole is formed with two holes overlapping whose cross sections take the shape of circles. The formation of the hole is thereby easily achieved. In this case, too, it is preferable to form two surfaces 155 parallel to the length of the jig 140.

Figure 22:
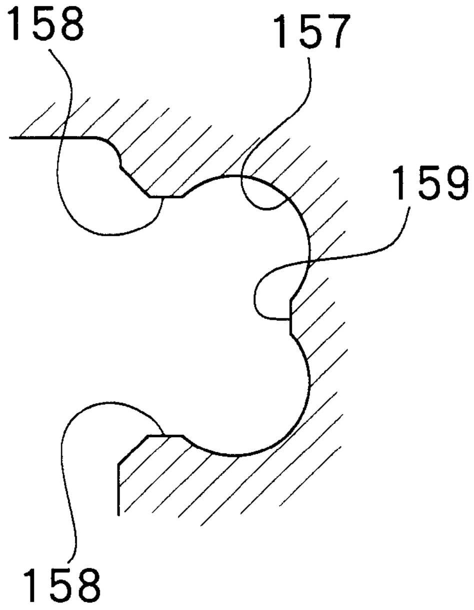
FIG. 22 is an explanatory view for showing another example of the shape of the engaging section of the jig of the fourth embodiment of the invention.

FIG. 22 shows another example of the shape of each engaging section 157. In this example, the engaging section 157 is formed with two holes overlapping whose cross sections take the shape of circles. The formation of the engaging section 157 is thereby easily achieved. In this case, too, it is preferable to form two surfaces 158 parallel to the length of the jig 140. Furthermore, it is preferable to form a surface 159 orthogonal to the length of the jig 140 on the back of the concave engaging section 157. The surface 159 is provided for aligning the guide pin 133 with respect to the length of the jig 140.

The remainder of configuration, functions and effects of the embodiment are similar to those of the first embodiment.

Figure 23:
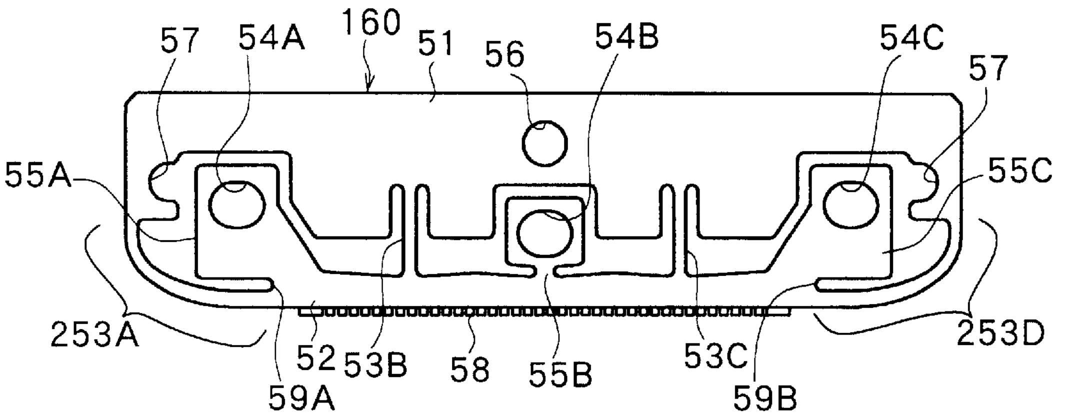
FIG. 23 is a front view of a jig of a fifth embodiment of the invention.

Referring to FIG. 23, a jig of a fifth embodiment of the invention will now be described. FIG. 23 is a front view of the jig of the fifth embodiment. The jig 160 of the embodiment comprises end couplers each in the shape of a curved plate. Instead of the end couplers 153A and 153D of the jig 140 of the fourth embodiment, the jig 160 comprises end couplers 253A and 253D. The end couplers 253A and 253D each take the shape of a curved plate that smoothly connects the main body 51 to the end of the retainer 52.

As the end couplers 153A and 153D of the fourth embodiment, the end couplers 253A and 253D have a function of conveying the bend in the Y direction generated in the retainer 52 to both ends of the jig 160 without regulating the bend in the Y direction in the retainer 52 and efficiently transforming the bend into a bend in the X direction.

The remainder of configuration, functions and effects of the embodiment are similar to those of the fourth embodiment.

Figure 24:
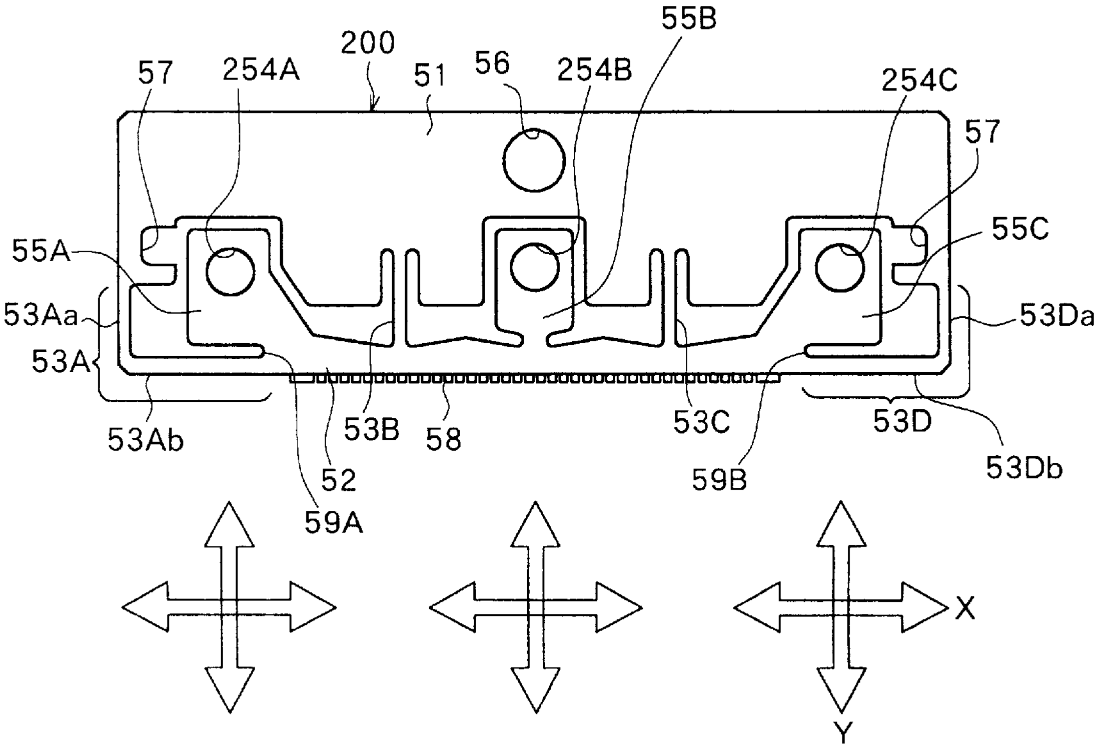
FIG. 24 is a front view of a jig of a sixth embodiment of the invention.
Figure 25:
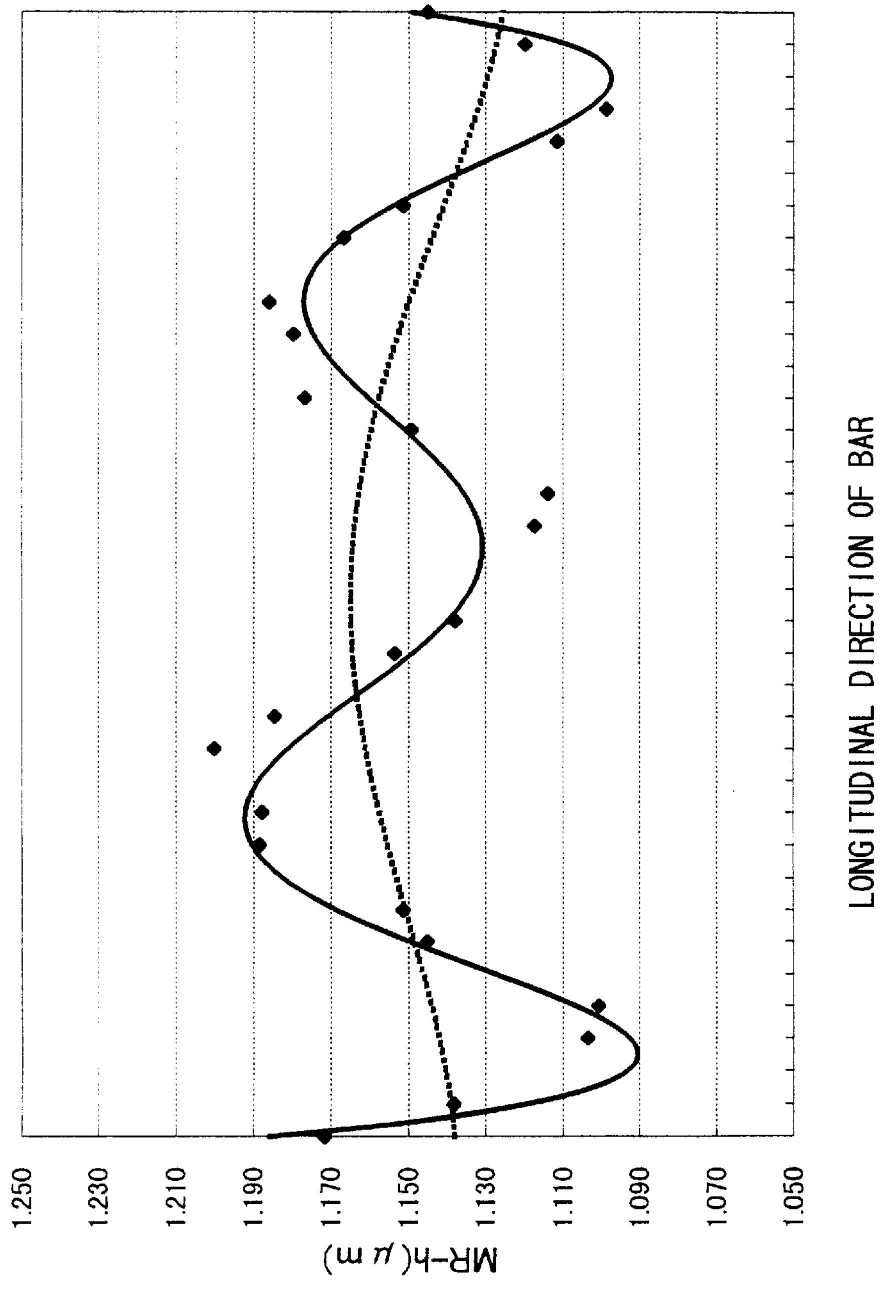
FIG. 25 shows an example of distribution of final MR heights on a bar when the bar is lapped with a jig of related art.

Referring to FIG. 24, a jig of a sixth embodiment of the invention will now be described. FIG. 24 is a front view of the jig of the sixth embodiment. Instead of the load application sections 54A, 54B and 54C each having the hole whose cross section is a rectangle of the jig 120 of the second embodiment, the jig 200 of the embodiment comprises load application sections 254A, 254B and 254C each having two degrees of freedom. The load application sections 254A, 254B and 254C each have a hole whose cross section is a circle and capable of receiving loads in the two directions of X and Y.

The remainder of configuration, functions and effects of the embodiment are similar to those of the second embodiment. Instead of the load application sections each having the hole whose cross section is other than a circle of the jig of the first and third to fifth embodiments, the load application sections may be provided each of which has two degrees of freedom and has a hole whose cross section is a circle and capable of receiving loads in the two directions of X and Y.

The present invention is not limited to the embodiments described so far. For example, the load application sections having a plurality of degrees of freedom may have any two degrees of freedom of the total of three directions including the two directions orthogonal to each other and the direction of rotation. Although a plurality of load application sections are required, at least one of the sections has a plurality of degrees of freedom. It is preferable to determine an optimum jig by selecting an optimum combination of the number and types of loads applied to the jig, considering the accuracy required for throat heights and MR heights and limitation placed on the production system with the processing apparatus as the chief unit.

Although processing of composite thin film magnetic heads each made up of a layer of an induction magnetic transducer for writing and an MR element for reading is described in the foregoing embodiments, the invention is applicable to processing of thin film magnetic heads each having an induction magnetic transducer for writing and reading.

The invention may be applied to any other processing such as polishing and grinding besides lapping.

The invention may be applied to processing of any other object other than magnetic heads.

As described so far, the processing jig of the invention comprises: the main body fixed to the processing apparatus; the retainer that is long in one direction for retaining the object; a plurality of couplers for coupling the retainer and the main body to each other; and a plurality of load application sections, coupled to the retainer, to which a load is applied for deforming the retainer. At least one of the load application sections has a plurality of degrees of freedom. As a result, the object is deformed into a more complicated shape and the object is thereby processed with accuracy.

The processing jig of the invention may further comprise the arm for coupling the load application section having a plurality of degrees of freedom and the retainer to each other. The retainer is thereby easily deformed when a load applied to the load application section is small.

According to the processing jig of the invention, the arm may couple the load application section and the retainer to each other so that the center of the load application section and the center of rotation where the retainer is deformed in a direction of rotation due to a displacement of the load application section are placed in positions shifted with respect to the direction of length of the retainer. It is further achieved to correct a bend near both ends of the retainer and obtain a desired shape of the retainer.

In the processing jig of the invention, the intermediate coupler that couples the retainer to the main body between the neighboring load application sections may take a shape of a flexible plate. As a result, the structure of the intermediate coupler hardly interfere with deformations of the retainer.

In the processing jig of the invention, the end couplers that couples both ends of the length of the retainer to the main body may each take a shape of a flexible plate. The end couplers have a flexible structure that hardly interfere with deformations of the retainer while maintaining the torsional rigidity of the retainer at a high value.

In the processing jig of the invention, the retainer may have a section whose thickness increases with distance from the couplers between the neighboring couplers. As a result, the retainer is less affected by an external force.

In the processing jig of the invention, the main body may have a fixing section provided in only one position in the main body for fixing the main body to the processing apparatus. As a result, the flatness of the surface of the object to be processed is further improved.

In the processing jig of the invention, the main body may further include a rotation preventing section for preventing the main body from rotating about the fixing section. The main body is thereby prevented from rotating about the fixing section.

In the processing jig of the invention, the rotation preventing section may include at least one engaging section in which at least one rotation preventing member provided in the processing apparatus is engaged. The engaging section may include two parallel surfaces for limiting a shift in a position of the main body with respect to the rotation preventing member in the direction of rotation about the fixing section and for allowing a shift in a position of the main body by a specific amount with respect to the rotation preventing member in the direction intersecting the direction of rotation about the fixing section. As a result, deformations of the jig fixed to the processing apparatus is prevented and the flatness of the surface of the object to be processed is further improved.

Obviously many modifications and variations of the present invention are possible in the light of the above teachings. It is therefore to be understood that within the scope of the appended claims the invention may be practiced otherwise than as specifically described.

What is claimed is:

1. A processing jig for retaining an object to be processed that is long in one direction, fixed to a processing apparatus for processing the object, comprising:

a main body to be fixed to the processing apparatus;

a retainer that is long in one direction for retaining the object;

a plurality of couplers for coupling the retainer and the main body to each other; and at least one of the load application sections moves at least two of the following movements: a first linear direction, a second linear direction that extends at an angle to the first linear direction and a rotational direction.

2. A processing jig according to claim 1 wherein the load application section having a plurality of degrees of freedom has three degrees of freedom in two directions orthogonal to each other and a direction of rotation.

3. A processing jig according to claim 2 wherein the load application section having the three degrees of freedom has a hole capable of receiving loads in three directions whose cross section takes a shape of other than a circle.

4. A processing jig according to claim 1 wherein the load application section having a plurality of degrees of freedom has two degrees of freedom in two directions orthogonal to each other.

5. A processing jig according to claim 4 wherein the load application section having the two degrees of freedom has a hole capable of receiving loads in two directions whose cross section takes a shape of a circle.

6. A processing jig according to claim 1 further comprising an arm for coupling the load application section having a plurality of degrees of freedom and the retainer to each other.

7. A processing jig according to claim 6 wherein the arm couples the load application section and the retainer to each other so that the center of the load application section and the center of rotation where the retainer is deformed in a direction of rotation due to a displacement of the load application section are placed in positions shifted with respect to the direction of length of the retainer.

8. A processing jig according to claim 1 wherein the plurality of couplers include two end couplers for coupling both ends of the length of the retainer to the main body and at least one intermediate coupler for coupling the retainer and the main body in a position between the neighboring load application sections.

9. A processing jig according to claim 8 wherein the intermediate coupler is plate shaped and flexible, one end of the intermediate coupler being connected to the main body and the other end being connected to the retainer.

10. A processing jig according to claim 8 wherein each of the end couplers is plate shaped and flexible, one end of each of the end couplers being connected to the main body and the other end being connected to the retainer.

11. A processing jig according to claim 10 wherein each of the end couplers includes a first linear section and a second linear section that extends from the first linear section at an angle.

12. A processing jig according to claim 10 wherein each of the end couplers are curved in a lengthwise direction.

13. A processing jig according to claim 8 wherein three of the load application sections are provided, two of the intermediate couplers are provided, and the intermediate couplers and the end couplers each take a shape of a flexible plate whose one end is connected to the main body and the other end is connected to the retainer.

14. A processing jig according to claim 8 wherein two of the load application sections are provided, two of the intermediate couplers are provided, and the intermediate couplers and the end couplers each take a shape of a flexible plate whose one end is connected to the main body and the other end is connected to the retainer.

15. A processing jig according to claim 1 wherein the retainer has a section whose thickness increases with distance from the couplers between the neighboring couplers.

16. A processing jig according to claim 1 wherein the main body has a fixing section provided in only one position in the main body for fixing the main body to the processing apparatus.

17. A processing jig according to claim 16 wherein the fixing section is a hole to which a fixture for fixing the main body to the processing apparatus is inserted.

18. A processing jig according to claim 16 wherein the main body further includes a rotation preventing section for preventing the main body from rotating about the fixing section.

19. A processing jig according to claim 18 wherein the rotation preventing section includes at least one engaging section in which at least one rotation preventing member provided in the processing apparatus is engaged.

20. A processing jig according to claim 19 wherein the engaging section includes two parallel surfaces for limiting a shift in a position of the main body with respect to the rotation preventing member in the direction of rotation about the fixing section and for allowing a shift in a position of the main body by a specific amount with respect to the rotation preventing member in the direction intersecting the direction of rotation about the fixing section.

* * * * *

UNITED STATES PATENT AND TRADEMARK OFFICE
CERTIFICATE OF CORRECTION

PATENT NO. : 6,050,878
DATED : April 18, 2000
INVENTOR(S) : Noboru Kanzo et al.

It is certified that error appears in the above-identified patent and that said Letters Patent is hereby corrected as shown below:

Column 16
Line 44, change "a mount" to --amount--.

Claim 1
Between line 8 and line 9, insert -- a plurality of load application sections, coupled to the retainer, to which a load is applied for deforming the retainer; wherein --.
Line 9, after "moves" insert -- in --.

IN THE DRAWINGS:
Please substitute Figure 5, as attached.

Signed and Sealed this

Twenty-eighth Day of July, 2001

Attest:

*Nicholas P. Godici*

NICHOLAS P. GODICI

*Attesting Officer* *Acting Director of the United States Patent and Trademark Office*

UNITED STATES PATENT AND TRADEMARK OFFICE

CERTIFICATE OF CORRECTION

PATENT NO. : 6,050,878
DATED : April 18, 2000
INVENTOR(S) : Noboru Kanzo et al.

It is certified that error appears in the above-identified patent and that said Letters Patent is hereby corrected as shown below:

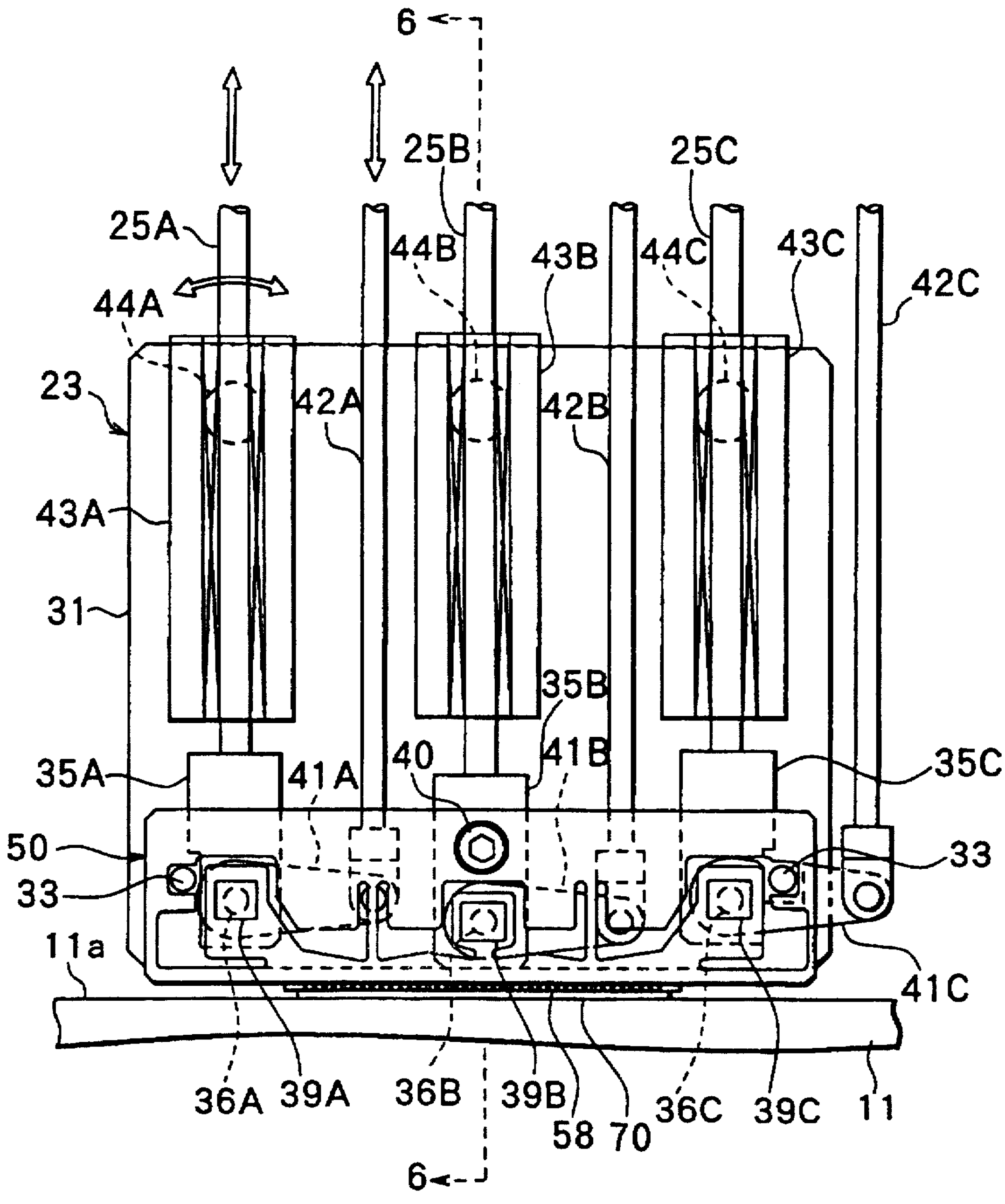

FIG.5

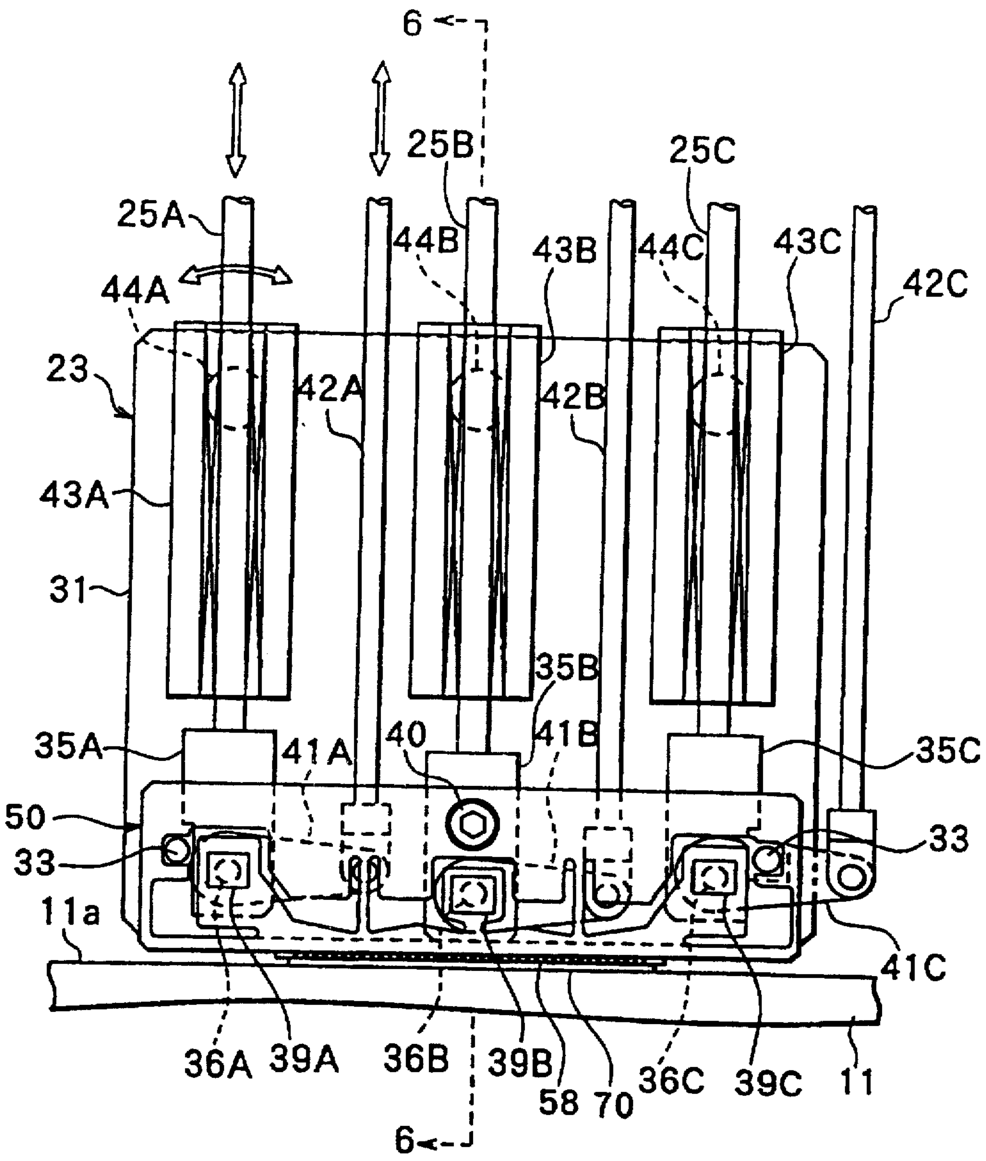
6
25A
25B
25C
44A
44B
43B
44C
43C
42C
23
42A
42B
43A
31
35B
35A
41A
40
41B
35C
50
33
33
11a
41C
36A
39A
36B
39B
58
70
36C
39C
11
6